(12) United States Patent
Norris et al.

(10) Patent No.: US 10,098,371 B2
(45) Date of Patent: *Oct. 16, 2018

(54) MICROALGAL FLOUR

(71) Applicant: Solazyme Roquette Nutritionals, LLC, South San Francisco, CA (US)

(72) Inventors: Leslie Norris, San Rafael, CA (US); John Piechocki, Redwood City, CA (US); Enrique Baliu, San Bruno, CA (US); Ruchir Desai, Foster City, CA (US); Marie Le Ruyet, Bethune (FR); Samuel Patinier, Lille (FR); Damien Passé, Douai (FR); Amandine Druon, Lille (FR)

(73) Assignee: SOLAZYME ROQUETTE NUTRITIONALS, LLC, South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/837,514

(22) Filed: Mar. 15, 2013

(65) Prior Publication Data

US 2014/0212570 A1    Jul. 31, 2014

Related U.S. Application Data

(60) Provisional application No. 61/757,534, filed on Jan. 28, 2013.

(51) Int. Cl.
    *A23L 1/28*     (2006.01)
    *A23L 1/337*    (2006.01)
    (Continued)

(52) U.S. Cl.
    CPC .............. *A23L 1/337* (2013.01); *A23L 17/60* (2016.08)

(58) Field of Classification Search
    CPC ............ A23L 1/30; A23D 7/003; A23D 7/053
    (Continued)

(56) References Cited

U.S. PATENT DOCUMENTS 2,506,540 A    5/1950   Collis
2,967,700 A    1/1961   Lee et al.
(Continued)

FOREIGN PATENT DOCUMENTS

CN    101037639 A    9/2007
FR    2924126 A1     5/2009
(Continued)

OTHER PUBLICATIONS

Xu et al., High Quality Biodiesel Production From a Microalga Chlorella prototheocoides by Heterotrophic Growth in Fermenters, Journal of Biotechnology 126 (2006) 499-507 (XU).*

(Continued)

*Primary Examiner* — Donald Tarazano
*Assistant Examiner* — Philip Dubois
(74) *Attorney, Agent, or Firm* — Weaver Austin Villeneuve & Sampson, LLP.

(57) ABSTRACT

The present invention relates to microalgal food products with acceptable sensory characteristics and methods of producing the food products. The flour can be produced by cultivating microalgal cells of a strain of *Chlorella protothecoides* under conditions of acceptable pH and dissolved oxygen to produce a desired amount of lipid. The microalgal cells can be lysed, heat-treated, washed and dried to produce a microalgal flour that can be incorporated into a variety of products.

23 Claims, 2 Drawing Sheets

(51) Int. Cl.
 *A23L 17/60* (2016.01)
 *A21D 6/00* (2006.01)
(58) Field of Classification Search
 USPC .......................................................... 426/61
 See application file for complete search history.

(56) References Cited

U.S. PATENT DOCUMENTS

| | | | |
|---|---|---|---|
| 3,142,135 A | 7/1964 | Kathrein | |
| 3,280,502 A | 10/1966 | Farrow et al. | |
| 3,320,693 A | 5/1967 | Shirota et al. | |
| 3,957,578 A | 5/1976 | Narita et al. | |
| 3,962,466 A | 6/1976 | Nakabayashi | |
| 3,983,008 A | 9/1976 | Shinozaki et al. | |
| 4,005,062 A | 1/1977 | Schnell | |
| 4,103,039 A | 7/1978 | Mandai et al. | |
| 4,104,460 A | 8/1978 | Hasebe | |
| 4,140,805 A | 2/1979 | Edwards et al. | |
| 4,182,777 A | 1/1980 | Saunders et al. | |
| 4,273,790 A | 6/1981 | Bosco et al. | |
| 4,324,067 A | 4/1982 | Kessler | |
| 4,341,038 A | 7/1982 | Bloch et al. | |
| 4,373,434 A | 2/1983 | Alexander et al. | |
| 4,390,561 A | 6/1983 | Blair et al. | |
| 4,519,845 A | 5/1985 | Ou | |
| 4,564,526 A | 1/1986 | Takashima | |
| 4,627,192 A | 12/1986 | Fick | |
| 4,673,490 A | 6/1987 | Subramanian et al. | |
| 4,744,996 A | 5/1988 | Rakow et al. | |
| 4,756,319 A * | 7/1988 | Takanashi | 131/334 |
| 4,901,635 A | 2/1990 | Williams | |
| 4,915,961 A | 4/1990 | Tanaka | |
| 5,001,059 A | 3/1991 | Skatrud et al. | |
| 5,130,242 A | 7/1992 | Barclay | |
| 5,212,087 A | 5/1993 | Fournier et al. | |
| 5,236,721 A | 8/1993 | Yung Chu et al. | |
| 5,252,198 A | 10/1993 | Harrison et al. | |
| 5,270,177 A | 12/1993 | Ramos Lazcano et al. | |
| 5,330,913 A | 7/1994 | Nakayama | |
| 5,338,673 A | 8/1994 | Thepenier et al. | |
| 5,354,878 A | 10/1994 | Connemann et al. | |
| 5,436,394 A | 7/1995 | Willmitzer et al. | |
| 5,487,916 A | 1/1996 | Christensen | |
| 5,492,938 A | 2/1996 | Kyle et al. | |
| 5,518,918 A | 5/1996 | Barclay | |
| 5,547,699 A | 8/1996 | Iizuka et al. | |
| 5,567,732 A | 10/1996 | Kyle et al. | |
| 5,595,965 A | 1/1997 | Wiggins | |
| 5,643,585 A | 7/1997 | Arad et al. | |
| 5,656,310 A | 8/1997 | Santillo, Jr. | |
| 5,680,812 A | 10/1997 | Linsgeseder | |
| 5,685,218 A | 11/1997 | Kemper | |
| 5,693,357 A | 12/1997 | Wong | |
| 5,711,983 A | 1/1998 | Kyle et al. | |
| 5,756,135 A | 5/1998 | Seeley | |
| 5,792,631 A | 8/1998 | Running | |
| 5,826,500 A | 10/1998 | Kemper | |
| 5,888,947 A | 3/1999 | Lambert et al. | |
| 5,900,370 A | 5/1999 | Running | |
| 5,945,585 A | 8/1999 | Hitz et al. | |
| 5,968,791 A | 10/1999 | Davis et al. | |
| 6,139,897 A | 10/2000 | Goto et al. | |
| 6,166,231 A | 12/2000 | Hoeksema | |
| 6,255,505 B1 | 7/2001 | Bijl et al. | |
| 6,294,207 B1 | 9/2001 | Christian sen et al. | |
| 6,338,866 B1 | 1/2002 | Criggall et al. | |
| 6,344,231 B1 | 2/2002 | Nakajo et al. | |
| 6,372,460 B1 | 4/2002 | Gladue et al. | |
| 6,441,208 B2 | 8/2002 | Bijl et al. | |
| 6,620,427 B2 | 9/2003 | Lasekan et al. | |
| 6,727,373 B2 | 4/2004 | Bijl et al. | |
| 6,750,048 B2 | 6/2004 | Ruecker et al. | |
| 6,867,308 B2 | 3/2005 | Bartok et al. | |
| 7,053,267 B2 | 5/2006 | Knauf et al. | |
| 7,063,957 B2 | 6/2006 | Chen | |
| 7,214,297 B2 | 5/2007 | Wang et al. | |
| 7,351,558 B2 | 4/2008 | Ruecker et al. | |
| 7,468,267 B2 | 12/2008 | Monod et al. | |
| 7,504,259 B2 | 3/2009 | Yadav et al. | |
| 7,588,931 B2 | 9/2009 | Damude et al. | |
| 7,662,598 B2 | 2/2010 | Ruecker et al. | |
| 7,678,931 B2 | 3/2010 | Fichtali et al. | |
| 7,781,193 B2 | 8/2010 | Ruecker et al. | |
| 7,879,591 B2 | 2/2011 | Damude et al. | |
| 7,883,882 B2 | 2/2011 | Franklin et al. | |
| 7,914,832 B2 | 3/2011 | Uchino | |
| 7,935,515 B2 | 5/2011 | Franklin et al. | |
| 7,939,710 B1 | 5/2011 | Apt et al. | |
| 8,029,579 B2 | 10/2011 | Knuth et al. | |
| 8,043,496 B1 | 10/2011 | Schuh et al. | |
| 8,119,583 B2 | 2/2012 | Day et al. | |
| 8,187,860 B2 | 5/2012 | Franklin et al. | |
| 8,222,010 B2 | 7/2012 | Franklin et al. | |
| 8,268,610 B2 | 9/2012 | Franklin et al. | |
| 8,278,261 B2 | 10/2012 | Day et al. | |
| 8,283,483 B2 | 10/2012 | Williams et al. | |
| 8,435,767 B2 | 5/2013 | Franklin et al. | |
| 8,450,083 B2 | 5/2013 | Day et al. | |
| 8,476,059 B2 | 7/2013 | Trimbur et al. | |
| 8,497,116 B2 | 7/2013 | Trimbur et al. | |
| 8,512,999 B2 | 8/2013 | Trimbur et al. | |
| 8,518,689 B2 | 8/2013 | Trimbur et al. | |
| 8,530,207 B2 | 9/2013 | Watts et al. | |
| 8,592,188 B2 | 11/2013 | Franklin et al. | |
| 8,633,012 B2 | 1/2014 | Franklin et al. | |
| 8,647,397 B2 | 2/2014 | Trimbur et al. | |
| 8,674,180 B2 | 3/2014 | Franklin et al. | |
| 8,697,402 B2 | 4/2014 | Trimbur et al. | |
| 8,697,427 B2 | 4/2014 | Franklin et al. | |
| 8,747,834 B2 | 6/2014 | Brinkmann et al. | |
| 8,765,424 B2 | 7/2014 | Franklin et al. | |
| 8,772,575 B2 | 7/2014 | Franklin et al. | |
| 8,790,914 B2 | 7/2014 | Trimbur et al. | |
| 8,802,422 B2 | 8/2014 | Trimbur et al. | |
| 8,822,176 B2 | 9/2014 | Day et al. | |
| 8,822,177 B2 | 9/2014 | Day et al. | |
| 8,846,352 B2 | 9/2014 | Chua et al. | |
| 8,846,375 B2 | 9/2014 | Franklin et al. | |
| 8,852,885 B2 | 10/2014 | Franklin et al. | |
| 8,889,401 B2 | 11/2014 | Trimbur et al. | |
| 8,889,402 B2 | 11/2014 | Trimbur et al. | |
| 8,945,908 B2 | 2/2015 | Franklin et al. | |
| 8,951,777 B2 | 2/2015 | Franklin et al. | |
| 9,062,294 B2 | 6/2015 | Franklin et al. | |
| 9,066,527 B2 | 6/2015 | Franklin et al. | |
| 9,068,213 B2 | 6/2015 | Franklin et al. | |
| 9,102,973 B2 | 8/2015 | Franklin et al. | |
| 9,109,239 B2 | 8/2015 | Franklin et al. | |
| 9,345,730 B2 | 5/2016 | Brinkmann et al. | |
| 2002/0122868 A1 | 9/2002 | Floeter et al. | |
| 2003/0097686 A1 | 5/2003 | Knauf et al. | |
| 2003/0138477 A1 | 7/2003 | Barclay | |
| 2003/0229237 A1 | 12/2003 | Haas et al. | |
| 2004/0162266 A1 | 8/2004 | Myatt et al. | |
| 2004/0230085 A1 | 11/2004 | Jakkula et al. | |
| 2005/0005333 A1 | 1/2005 | Ruezinsky et al. | |
| 2005/0008656 A1 | 1/2005 | Meredith et al. | |
| 2005/0153002 A1 | 7/2005 | Socla Rosales et al. | |
| 2005/0170479 A1 | 8/2005 | Weaver et al. | |
| 2005/0262588 A1 | 11/2005 | Dehesh et al. | |
| 2005/0266537 A1 | 12/2005 | Chen | |
| 2006/0094254 A1 | 5/2006 | Picataggio et al. | |
| 2006/0094089 A1 * | 5/2006 | Barclay | 435/134 |
| 2006/0122410 A1 | 6/2006 | Fichtali et al. | |
| 2006/0286205 A1 | 12/2006 | Fichtali et al. | |
| 2007/0009988 A1 | 1/2007 | Monod et al. | |
| 2007/0099280 A1 | 5/2007 | Barclay | |
| 2007/0118916 A1 | 5/2007 | Puzio et al. | |
| 2007/0160728 A1 | 7/2007 | Rudie et al. | |
| 2007/0167396 A1 | 7/2007 | Dillon et al. | |
| 2007/0218183 A1 | 9/2007 | Nakhasi et al. | |
| 2007/0261138 A1 | 11/2007 | Graham et al. | |
| 2008/0019997 A1 | 1/2008 | Shaish et al. | |
| 2008/0107776 A1 | 5/2008 | Prakash et al. | |

(56) References Cited

U.S. PATENT DOCUMENTS

| | | |
|---|---|---|
| 2008/0160593 A1 | 7/2008 | Oyler |
| 2008/0206379 A1 | 8/2008 | Fabritius et al. |
| 2008/0283803 A1 | 11/2008 | Rapp et al. |
| 2009/0004715 A1 | 1/2009 | Trimbur et al. |
| 2009/0011480 A1 | 1/2009 | Trimbur et al. |
| 2009/0035842 A1 | 2/2009 | Trimbur et al. |
| 2009/0047721 A1 | 2/2009 | Trimbur et al. |
| 2009/0061493 A1 | 3/2009 | Trimbur et al. |
| 2009/0064567 A1 | 3/2009 | Lippmeier et al. |
| 2009/0068315 A1 | 3/2009 | Hundscheid et al. |
| 2009/0099260 A1 | 4/2009 | Namal Senanayake et al. |
| 2009/0142322 A1 | 6/2009 | Ye |
| 2009/0148918 A1 | 6/2009 | Trimbur et al. |
| 2009/0211150 A1 | 8/2009 | Wu et al. |
| 2009/0234146 A1 | 9/2009 | Cooney et al. |
| 2009/0274736 A1 | 11/2009 | Dillon et al. |
| 2009/0298159 A1 | 12/2009 | Wu et al. |
| 2010/0010088 A1 | 1/2010 | Chilton et al. |
| 2010/0021912 A1 | 1/2010 | Farese et al. |
| 2010/0028488 A1 | 2/2010 | Lo et al. |
| 2010/0058651 A1 | 3/2010 | Knuth et al. |
| 2010/0120643 A1 | 5/2010 | Brown et al. |
| 2010/0151112 A1 | 6/2010 | Franklin et al. |
| 2010/0151538 A1 | 6/2010 | Franklin et al. |
| 2010/0151567 A1 | 6/2010 | Franklin et al. |
| 2010/0170144 A1 | 7/2010 | Day et al. |
| 2010/0186117 A1 | 7/2010 | Fabijanski et al. |
| 2010/0196575 A1 | 8/2010 | Sanchez et al. |
| 2010/0239712 A1 | 9/2010 | Brooks et al. |
| 2010/0297292 A1 | 11/2010 | Brooks et al. |
| 2010/0297295 A1 | 11/2010 | Brooks et al. |
| 2010/0297296 A1 | 11/2010 | Brooks et al. |
| 2010/0297323 A1 | 11/2010 | Brooks et al. |
| 2010/0297325 A1 | 11/2010 | Brooks et al. |
| 2010/0297331 A1 | 11/2010 | Brooks et al. |
| 2010/0303957 A1 | 12/2010 | Brooks et al. |
| 2010/0303961 A1 | 12/2010 | Brooks et al. |
| 2010/0303989 A1 | 12/2010 | Brooks et al. |
| 2010/0303990 A1 | 12/2010 | Brooks et al. |
| 2010/0323413 A1 | 12/2010 | Trimbur et al. |
| 2010/0323414 A1 | 12/2010 | Trimbur et al. |
| 2011/0014665 A1 | 1/2011 | Trimbur et al. |
| 2011/0015417 A1 | 1/2011 | Trimbur et al. |
| 2011/0044915 A1 | 2/2011 | Ribadeau-Dumas |
| 2011/0047863 A1 | 3/2011 | Trimbur et al. |
| 2011/0072714 A1 | 3/2011 | Gaertner et al. |
| 2011/0190522 A1 | 8/2011 | Trimbur et al. |
| 2011/0203168 A1 | 8/2011 | Franklin et al. |
| 2011/0252696 A1 | 10/2011 | Franklin et al. |
| 2011/0256268 A1 | 10/2011 | Franklin et al. |
| 2011/0256282 A1 | 10/2011 | Piechocki et al. |
| 2011/0293785 A1 | 12/2011 | Franklin et al. |
| 2011/0294174 A1 | 12/2011 | Franklin et al. |
| 2011/0305740 A1 | 12/2011 | Boursier |
| 2012/0027724 A1 | 2/2012 | Brinkmann et al. |
| 2012/0028319 A1 | 2/2012 | Trimbur et al. |
| 2012/0034662 A1 | 2/2012 | Hu et al. |
| 2012/0122192 A1 | 5/2012 | Trimbur et al. |
| 2012/0128851 A1 | 5/2012 | Brooks et al. |
| 2012/0149075 A1 | 6/2012 | Day et al. |
| 2012/0164701 A1 | 6/2012 | Trimbur et al. |
| 2012/0203018 A1 | 8/2012 | Franklin et al. |
| 2012/0269949 A1 | 10/2012 | Nakajima et al. |
| 2012/0277452 A1 | 11/2012 | Franklin et al. |
| 2012/0277453 A1 | 11/2012 | Franklin et al. |
| 2012/0283460 A1 | 11/2012 | Franklin et al. |
| 2012/0288930 A1 | 11/2012 | Trimbur et al. |
| 2012/0324784 A1 | 12/2012 | Franklin et al. |
| 2012/0329109 A1 | 12/2012 | Chua et al. |
| 2013/0004646 A1 | 1/2013 | Franklin et al. |
| 2013/0005005 A1 | 1/2013 | Day et al. |
| 2013/0006006 A1 | 1/2013 | Day et al. |
| 2013/0031678 A1 | 1/2013 | Zheng et al. |
| 2013/0034887 A1 | 2/2013 | Franklin et al. |
| 2013/0078709 A1 | 3/2013 | Franklin et al. |
| 2013/0089916 A1 | 4/2013 | Franklin et al. |
| 2013/0096211 A1 | 4/2013 | Franklin et al. |
| 2013/0102039 A1 | 4/2013 | Franklin et al. |
| 2013/0122180 A1 | 5/2013 | Brooks et al. |
| 2013/0165677 A1 | 6/2013 | Franklin et al. |
| 2013/0197247 A1 | 8/2013 | Franklin et al. |
| 2013/0273621 A1 | 10/2013 | Franklin et al. |
| 2013/0295268 A1 | 11/2013 | Day et al. |
| 2013/0296591 A1 | 11/2013 | Day et al. |
| 2013/0309358 A1 | 11/2013 | Norris |
| 2013/0323382 A1 | 12/2013 | Franklin et al. |
| 2013/0330790 A1 | 12/2013 | Trimbur et al. |
| 2013/0338385 A1 | 12/2013 | Franklin et al. |
| 2014/0106051 A1 | 4/2014 | Lefevre et al. |
| 2014/0170716 A1 | 6/2014 | Trimbur et al. |
| 2014/0234479 A1 | 8/2014 | Norris et al. |
| 2014/0249342 A1 | 9/2014 | Franklin et al. |
| 2014/0256024 A1 | 9/2014 | Franklin et al. |
| 2014/0256600 A1 | 9/2014 | Dillon et al. |
| 2014/0287114 A1 | 9/2014 | Finely et al. |
| 2014/0305031 A1 | 10/2014 | Day et al. |
| 2014/0315267 A1 | 10/2014 | Franklin et al. |
| 2014/0328906 A1 | 11/2014 | Brinkmann et al. |
| 2014/0336100 A1 | 11/2014 | Day et al. |
| 2014/0357746 A1 | 12/2014 | Ngantung et al. |
| 2014/0377847 A1 | 12/2014 | Franklin et al. |
| 2015/0073163 A1 | 3/2015 | Chua et al. |
| 2015/0125914 A1 | 5/2015 | Franklin et al. |
| 2015/0218604 A1 | 8/2015 | Franklin et al. |
| 2015/0275149 A1 | 10/2015 | Dummer et al. |
| 2015/0344917 A1 | 12/2015 | Franklin et al. |
| 2015/0374012 A1 | 12/2015 | Klamczynska et al. |
| 2016/0021923 A1 | 1/2016 | Paulsen et al. |
| 2016/0324167 A1 | 11/2016 | Brooks et al. |
| 2017/0119005 A1 | 5/2017 | Piechocki et al. |

FOREIGN PATENT DOCUMENTS

| | | |
|---|---|---|
| GB | 1312355 A | 4/1973 |
| JP | 57-150379 A | 9/1982 |
| JP | 06-253872 A | 9/1994 |
| JP | 07-008217 | 1/1995 |
| JP | 07-075557 | 3/1995 |
| JP | 409252707 A | 9/1997 |
| JP | 2001-292751 A | 10/2001 |
| JP | 2002-125601 A | 5/2002 |
| JP | 2004-049079 A | 2/2004 |
| JP | 2004-275173 A | 10/2004 |
| WO | WO-94010288 A2 | 5/1994 |
| WO | WO-99037166 A1 | 7/1999 |
| WO | WO-0061740 A1 | 10/2000 |
| WO | WO-06/122299 A2 | 11/2006 |
| WO | WO-07/094498 A1 | 8/2007 |
| WO | WO-07117511 A2 | 10/2007 |
| WO | WO-07134294 A2 | 11/2007 |
| WO | WO-08002643 A2 | 1/2008 |
| WO | WO-08083352 A1 | 7/2008 |
| WO | WO-08130372 A2 | 10/2008 |
| WO | WO-08151149 A2 | 12/2008 |
| WO | WO-09126843 A2 | 10/2009 |
| WO | WO-09/147340 A1 | 12/2009 |
| WO | WO-10/007331 A2 | 1/2010 |
| WO | WO-10/007332 A2 | 1/2010 |
| WO | WO-10045368 A2 | 4/2010 |
| WO | WO-10063031 A2 | 6/2010 |
| WO | WO-10063032 A2 | 6/2010 |
| WO | WO-10120923 A1 | 10/2010 |
| WO | WO-11090730 A1 | 7/2011 |
| WO | WO-11130573 A1 | 10/2011 |
| WO | WO-11130576 A1 | 10/2011 |
| WO | WO-11130578 A2 | 10/2011 |
| WO | WO-11150410 A2 | 12/2011 |
| WO | WO-11150411 A1 | 12/2011 |

(56) References Cited

FOREIGN PATENT DOCUMENTS

| WO | WO-12106560 A1 | 8/2012 |
|---|---|---|
| WO | WO-12154626 A1 | 11/2012 |

OTHER PUBLICATIONS

Solazyme locates new Whole Algalin Flour project in France, http://www.biofuelsdigest.com/bdigest/2011/10/25/solazyme-locates-new-whole-algalin-flour-project-in-france/, Oct. 25, 2011.*
Solazyme Roquette Nutritionals Golden Chlorella® Omega to be key ingredient in Natural Vitality Release of new 30oz Bottle for Energy28;http://investors.terravia.com/releasedetail.cfm?releaseid=588870; Mar. 10, 2011.*
Algal Flour Chocolate Chip Coconut Cookies, by Mariah Kingman Sep. 18, 2011, AGB 410, http://www.algaecompetition.com/PDF.cfm/3food/3133.pdf.*
Memorandum Order, *Roquette Frères, S.A. v. Solazyme, Inc.*, C.A. No. 14/1442-SLR, District Court for the District of Delaware, Jan. 12, 2016.
Plaintiff and Counter-Defendant Roquette Frères, S.A.'s Reply Brief in Support of Its Motion for Stay Pending Appeal, *Roquette Frères, S.A. v. Solazyme, Inc.*, C.A. No. 14/1442-SLR, District Court for the District of Delaware, Jan. 8, 2016.
Defendant and Counterclaimant Solazyme, Inc.'s Brief in Opposition to Plaintiff and Counter-Defendant Roquette Freres, S.A.'s Motion to Stay Pending Appeal, *Roquette Frères, S.A. v. Solazyme, Inc.*, C.A. No. 14/1442-SLR, District Court for the District of Delaware, Jan. 6, 2016.
Declaration of Jonathan Wolfson in Support of Defendant and Counterclaimant Solazyme, Inc.'s Opposition to Plaintiff and Counterclaimant Roquette Freres, S.A.'s Motion to Stay Pending Appeal, *Roquette Frères, S.A. v. Solazyme, Inc.*, C.A. No. 14/1442-SLR, District Court for the District of Delaware, Jan. 6, 2016, Redacted Public Version.
Declaration of Jeffrey M. Goehring in Support of Plaintiff and Counter-Defendant Roquette Frères, S.A.'s Brief Motion for Stay Pending Appeal, *Roquette Frères, S.A. v. Solazyme, Inc.*, C.A. No. 14/1442-SLR, District Court for the District of Delaware, Dec. 28, 2015, Redacted Version Exhibit 1, BASF and Solazyme Launch the First Commercial Microalgae-Derived Betaine Surfactant, Solazyme, Inc., Jul. 28, 2015 Exhibit 2, Solazyme Bunge Renewable Oils Completes Key Redundant Power and Steam Supplies, Solazyme Bunge Renewable Oils, Jun. 30, 2015 Exhibit 3, Solazyme Receives FDA GRAS No Questions Letter for High Oleic Algae Oil, Solazyme, Inc., Feb. 24, 2015 Exhibit 4, Solazyme's (SZYM) CEO Jonathan Wolfson on Q1 2015 Results—Earnings Call Transcript, Solazyme, Inc., May 6, 2015 Exhibit 5, Solazyme's (SZYM) CEO Jonathan Wolfson on Q2 2015 Results—Earnings Call Transcript, Solazyme, Inc., Jul. 30, 2015 Exhibit 6, Solazyme's (SZYM) CEO Jonathan Wolfson on Q4 2014 Results—Earnings Call Transcript, Solazyme, Feb. 26, 2015 Exhibit 7, Redacted in Its Entirety.
Motion to Stay Pending Appeal and Order Granting Motion to Stay Pending Appeal, *Roquette Frères, S.A. v. Solazyme, Inc.*, C.A. No. 14/1442-SLR, District Court for the District of Delaware, Dec. 28, 2015.
Memorandum of Law in Support of Motion by Roquette Frères, S.A. For a Stay Pending Appeal, *Roquette Frères, S.A. v. Solazyme, Inc.*, C.A. No. 14/1442-SLR, District Court for the District of Delaware, Dec. 28, 2015.
Email dated Nov. 3, 2015, from Gerald Suh of Solazyme, Inc., to Jeffrey M. Goehring of Young & Thompson International Patent & Trademark Law (counsel for Roquette Frères, S.A.).
Letter dated Oct. 6, 2015, from Jeffrey M. Goehring of Young & Thompson International Patent & Trademark Law (counsel for Roquette Frères, S.A.) to Gerald Suh of Solazyme, Inc., and R. James Balls and William E. McShane of Novak Druce Connolly Bove + Quigg LLP (counsel for Solazyme Roquette Nutritionals, LLC), which included the following enclosures: Exhibits 1, 9-12, and 14-15 to the Declaration of Jeffrey M. Goehring in Support of Roquette Frères, S.A.'s Brief in Support of Its Motion for Summary Judgment of Solazyme, Inc.'s Claim for Misappropriation of Trade Secrets, *Roquette Frères, S.A. v. Solazyme, Inc.*, C.A. No. 14-01442, District Court for the District of Delaware, D.I. 141, Jun. 22, 2015, Redacted Version Exhibits 2-8 To the Declaration of Jeffrey M. Goehring in Support of Roquette Frères, S.A.'s Brief in Support of Its Motion for Summary Judgment of Solazyme, Inc.'s Claim for Misappropriation of Trade Secrets, *Roquette Frères, S.A. v. Solazyme, Inc.*, C.A. No. 14-01442, District Court for the District of Delaware, D.I. 112-1, Jun. 22, 2015 Exhibit 13 To the Declaration of Jeffrey M. Goehring in Support of Roquette Frères, S.A.'s Brief in Support of Its Motion for Summary Judgment of Solazyme, Inc.'s Claim for Misappropriation of Trade Secrets, *Roquette Frères, S.A. v. Solazyme, Inc.*, C.A. No. 14-01442, District Court for the District of Delaware, D.I. 112-2, Jun. 22, 2015 Declaration of Jeffrey M. Goehring in Support of Roquette Frères, S.A.'s Brief in Support of Its Motion for Summary Judgment of Solazyme, Inc.'s Claim for Misappropriation of Trade Secrets, *Roquette Frères, S.A. v. Solazyme, Inc.*, C.A. No. 14-01442, District Court for the District of Delaware, D.I. 112, Jun. 22, 2015 Roquette Frères, S.A.'s Opening Brief in Support of Its Motion for Summary Judgment of Solazyme, Inc.'s Claim for Misappropriation of Trade Secrets, *Roquette Frères, S.A. v. Solazyme, Inc.*, C.A. No. 14-01442, District Court for the District of Delaware, D.I. 140, Jun. 22, 2015, Redacted Version.
Letter dated Nov. 2, 2015, from Jeffrey M. Goehring of Young & Thompson International Patent & Trademark Law (counsel for Roquette Frères, S.A.) to Gerald Suh of Solazyme, Inc., and R. James Balls and William E. McShane of Novak Druce Connolly Bove + Quigg LLP (counsel for Solazyme Roquette Nutritionals, LLC), which included the same enclosures included with the letter dated Oct. 6, 2015 of Cite No. CB.)
Email dated Nov. 4, 2015, from Jeffrey M. Goehring of Young & Thompson International Patent & Trademark Law (counsel for Roquette Frères, S.A.) to Gerald Suh of Solazyme, Inc., and R. James Balls and William E. McShane of Novak Druce Connolly Bove + Quigg LLP (counsel for Solazyme Roquette Nutritionals, LLC).
Opinion dated Dec. 21, 2015 in *Roquette Frères, S.A., v. Solazyme, Inc.*, Case No. 1:14-cv-01442 (D. Del. 2015) granting Solazyme's motion for an order confirming the arbitration award rendered by CPR International Institute for Conflict Prevention & Resolution on Feb. 19, 2015, in favor of Solazyme, Inc.
Application No. PCT/US09/060692, International Search Report dated Apr. 22, 2010.
Application No. PCT/US09/060692, Written Opinion of the International Searching Authority dated Apr. 22, 2010.
Application No. PCT/US10/31088, International Search Report dated Jun. 28, 2010.
Application No. PCT/US10/31088, Written Opinion of the International Searching Authority dated Jun. 28, 2010.
Application No. PCT/US11/32586, International Search Report dated Jun. 20, 2011.
Application No. PCT/US11/32586, Written Opinion of the International Searching Authority dated Jun. 20, 2011.
Application No. PCT/US11/32588, International Search Report dated Jun. 27, 2011.
Application No. PCT/US11/32588, Written Opinion of the International Searching Authority dated Jun. 27, 2011.
Bigogno et al., "Biosynthesis of arachidonic acid in the oleaginous microalga Parietochloris incisa (Cholorphyceae): Radiolabeling studies," *Lipids* 37(2):209-216 (2002).
Brown et al., "The amino-acid and sugar composition of 16 species of micralgae used in mariculture," *J. Exp. Mar. Biol. Ecol.* 145:79-99 abstract (1991).
Curtain, "Plant Biotechnology—The growth of Australia's algal b-carotene industry," *Australasian Biotech.* 10(3):19-23 (2000). [Retrieved from the Internet Apr. 5, 2010:<http://www.bioline.org.br/request?au000324>].
GenBank Direct submission L42851, "Prototheca wickerhamii large subunit ribosomal RNA (rrnL) gene, partial sequence; chloroplast gene for chloroplast product," Nov. 21, 2002 [retrieved from the Internet Dec. 23, 2009:<http://www.ncbi.nlm.nih.9ov/nuccore/170280734>].

(56) References Cited

OTHER PUBLICATIONS

Hase et al., "Nutritional Control of Cell Pigmentation in Chlorella Protothecoides With Special Reference to the Degeneration of Chloroplast Induced by Glucose," Plant and Cell Physiology, 5(2):227-240 (1964), [online abstract], Retrieved on Jun. 3, 2010 from http://pcp.oxfordiounals.org/cgi/content/abstract/5/2/22.
Henderson et al., "Lipid Composition and Biosynthesis in the Marine Dinoflagellate Crypthecodznzum Cohnii," Phytochem. 27(6):1679-1683 (1988).
Kenyon, "Fatty Acid Composition of Unicellular Strains of Blue-Green Algae," J. Bacteriology109(2):827-834 (1972).
Krinsky et al., "The Appearance of Neoxanthin during the Regreening of Dark-grown Euglena," Plant Physiol. 39(4441-445 (1964).
Lahaye, "Marine Algae as Sources of Fibres: Determination of Soluble and Incoluble Dietary Fibre Contents in Some 'Sea Vegetables'," J. Sci. Food Agric. 54:587-594 (1991).
Liang et al., "Current microalgal health food R&D activities in China", Hydrobiologia 512:45-48, (2004).
Lord, "Taurine is essential for cats," Jan. 27, 2008 [retrieved from the Internet Apr1 6, 2010:<http://www.vetlord. org/taurine-is-essential-for-cats/>].
Lubitz, "The Protein Quality, Digestibility, and Composition of Algae, Chlorella 71105," J. Food Sci. 28(2):229-232 (1963).
Petkov et al., "Which are fatty acids of the green alga Chlorella?," Biochemical Systematics and Ecology, 35:281-285, (2007).
Powell et al., "Algae Feeding in Humans," J. Nutrition, 75:7-12, (1961).
Spolaore et al., "Commercial Applications of Microalgae," J. Biosci. Bioeng. 101(2):87-96 (2006).
Takeda, "Sugar Composition of the Cell Wall and the Taxonomy of Chlorella (Chlorophyceae)," Journal of Psychology, 27(2):224-232, (1991), [online abstract], Retrieved on Jun. 4, 210 from http://www3.interscience.wiley.com/journal/119345932/abstract.
Xu et al., "High Quality Biodiesel Production From a Microalga Chlorella Protothecoides by Heterotrophic Growth in Fermenters," Journal of Biotechnology, 126(4):499-507, (2006).
Aggelis et al., "Enhancement of single cell oil production by Yarrowia lipolytica growing in the presence of Teucrium polium L. aqueous extract," Biotechnology Letters, 21:747-749, (1999).
Bonaventure et al., "Disruption of the FATB Gene in Arabidopsis Dethonstrates an Essential Role of Saturated Fatty Acids in Plant Growth," The Plant Cell 15:1020-1033, (2003).
Borza et al., "Multiple Metabolic Roles for the Nonphotosynthetic Plastid of the Green Alga Prototheca Wickerhamii," Eukaryotic Cell, 4(2):253-261, (2005).
Courchesne et al., "Enhancement of Lipid Production Using Biochemical, Genetic and Transcription Factor Engineering Approaches," J Biotechnol. Epub, 141(1-2):31-41, (2009).
Dehesh et al., "KAS IV: a 3-ketoacyl-ACP synthase from Cuphea sp. is a medium chain specific condensing enzyme," The Plant Journal, 15:383-390, (1998).
Dehesh et al., "Production of high levels of 8:0 and 10:0 fatty acids in transgenic canola by overexpression of Ch FatB2, a thioesterase cDNA from Cuphea hookeriana," The Plant Journal, 9(2):167-172, (1996).
Dunahay et al., "Genetic Engineering of Microalgae for Fuel Production," Applied Biochemistry and Biotechnology, 34/35:331-339 (1992).
Dunahay et al., "Manipulation of Microalgal Lipid Production Using Genetic Engineering," Applied Biochemistry and Biotechnology, 57/58:223-231, (1996).
El-Fadaly et al., "Single Cell Oil Production by an Oleaginous Yeast Strain in a Low Cost Cultivation Medium," Research Journal of Microbiology, 4(8):301-313, (2009).
El-Sheekh et al., "Variation of Some Nutritional Constituents and Fatty Acid Profiles of Chlorella vulgaris Beijerinck Grown under Auto and Heterotrophic Conditions," International Journal of Botany, 5(2):153-159, (2009).
European Search Report and European Search Opinion for application EP08769988 dated Jul. 1, 2011.

European Search Report and European Search Opinion for application EP11158642 dated Jul. 1, 2011.
Evans et al., "A comparison of the oleaginous yeast, Candida curvata, grown on different carbon sources in continuous and batch culture," Lipids, 18(09):623-629, (1983).
Fall et al., "Bioconversion of Xylan to Triglycerides by Oil-Rich Yeasts," Applied and Environmental Microbiology, 47(5):1130-1134, (1984).
Ferrentino, "Microalgal oil extraction and in situ transesterification," University of New Hampshire, Pub. No. MT 1447885, 93 pages, (2007).
Ferrentino, et al., "Microalgal Oil Extraction and In-situ Transesterification," AlChE Annual Mtg, San Francisco, CA, Nov. 11-13, 2006. Abstract.
Gill et al., "Lipid Accumulation in an Oleaginous Yeast (Candida 107) Growing on Glucose in Single-Stage Continuous Culture," Applied and Environmental Microbiology, 33(02):231-239, (1977).
Gul et al., "Sterols and the Phytosterol Content in Oilseed Rape (Brassica napus L.)," Journal of Cell and Molecular Biology, 5:71-79 (2006).
Hall et al., "Lipid Accumulation in an Oleaginous Yeast (Candida 107) Growing on Glucose Under Various Conditions in a One- and Two-Stage Continuous Culture," Applied and Environmental Microbiology, 33(3):577-584, (1977).
Heise et al., "Factors Controlling Medium-Chain Fatty Acid Synthesis in Plastids From Cuphea Embryos," Prog. Lipid Res., 33(1/2):87-95, (1994).
Heredia et al., "Simultaneous utilization of glucose and xylose by Candida curvata D in continuous culture," Biotechnology Letters, 10(01):25-30, (1988).
Jaworski et al., "Industrial oils from transgenic plants," Current Opinion in Plant Biology, 6:178-184, (2003).
Katayama et al., "Alpha-Linolenate and Photosynethetic Activity in Chlorella Protothecoides," Plant Physiol., 42:308-313, (1967).
Kong et al., "Microbial production of lipids by cofermentation of glucose and xylose with Lipomyces starkeyi 2#," Chinese Journal of Bioprocess Engineering, 05(02):36, (2007). Abstract.
Li et al., "High-density cultivation of oleaginous yeast Rhodosporidium toruloides Y4 in fed-batch culture," Enzyme and Microbial Technology, 41:312-317, (2007).
Li et al., "Screening of oleaginous yeasts for broad-spectrum carbohydrates assimilating capacity," China Biotechnology, 25(12):39-44 (2005), and machine translation.
Meesters et al., "High-cell-density cultivation of the lipid accumulating yeast Cryptococcus curvatus using glycerol as a carbon source," Applied Microbiology and Biotechnology, 45:575-579, (1996).
Meng et al., "Biodiesel production from oleaginous microorganisms," Renewable Energy, 34:1-5, (2009).
Miao et al., "High Yield Bio-Oil Production from Fast Pyrolysis by Metabolic Controlling of Chlorella Protothecoides," J. Biotech., 110:85-93, (2004).
Morris, "Effect of Growth Temperature on the Cryopreservation of Prototheca," Journal of General Microbiology, 94:395-399, (1976).
Murakami et al., "Lipid Composition of Commercial Bakers' Yeasts Having Different Freeze-tolerance in Frozen Dough," Biosci. Biotechnol. Biochem., 60(11)1874-1876, (1996).
Otles et al., "Fatty Acid Composition of Chlorella and Spirulina Microalgae Species," Journal of AOAC International, 84(6):1708-1714, (2001).
Papanikolaou et al., "Lipid production by Yarrowia lipolytica growing on industrial glycerol in a single-stage continuous culture," Bioresource Technology, 82:43-49, (2002).
Patil et al., "Fatty acid composition of 12 microalgae for possible use in aquaculture feed," Aquacult Int , 15:1-9, (2007).
PCT International Preliminary Report on Patentability (Chapter I) of Dec. 7, 2009 for application PCT/US08/65563.
PCT International Preliminary Report on Patentability for application PCT/US10/31088 dated Oct. 27, 2011.
PCT International Search Report of Nov. 6, 2008 for application PCT/US08/65563.
PCT Search Report for application PCT/US2011/038464 dated Nov. 3, 2011.

(56) References Cited

OTHER PUBLICATIONS

PCT Written Opinion of the International Searching Authority for application PCT/US2011/038464 dated Nov. 3, 2011.
PCT Written Opinion of the International Searching Authority of Nov. 6, 2008 for application PCT/US08/65563.
Ratledge, "Regulation of lipid accumulation in oleaginous microorganisms," Biochem Soc Trans., 30(Pt 6):1047-1050, 2002.
Ritsema et al., "Engineering fructan metabolism in plants," J. Plant Physiol., 160:811-820, (2003).
Rosenberg et al., "A Green Light for Engineered Algae: Redirecting Metabolism to Fuel a Biotechnology Revolution," Current Opinion in Biotechnology. Tissue, Cell and Pathyway Engineering, E-Pub 19:430-436, (2008).
Roy et al., "Production of Intracellular Fat by the Yeast Lipomyces starkeyi," Indian Journal of Experimental Biology, 16(4):511-512, (1978).
Sud et al., "Lipid Composition and Sensitivity of Prototheca wickerhamii to Membrane-Active Antimicrobial Agents," Antimicrobial Agents and Chemotherapy, 16:486-490, (1979).
Suh et al., "What limits production of unusual monoenoic fatty acids in transgenic plants?," Planta, 215:584-595, (2002).
Tornabene et al., "Lipid composition of the nitrogen starved green alga Neochloris oleoabundans," Enzyme Microb. Technol., 5:435-440, (1983).
U.S. Appl. No. 12/579,091, Requirement for Restriction/Election dated Oct. 18, 2012.
U.S. Appl. No. 12/684,884, Requirement for Restriction/Election dated Oct. 23, 2012.
U.S. Appl. No. 12/684,885, Requirement for Restriction/Election dated Oct. 5, 2012.
U.S. Appl. No. 12/684,886, Requirement for Restriction/Election dated Nov. 2, 2012.
U.S. Appl. No. 12/684,887, Requirement for Restriction/Election dated Oct. 12, 2012.
U.S. Appl. No. 12/684,888, Requirement for Restriction/Election dated Oct. 29, 2012.
U.S. Appl. No. 12/684,889, Requirement for Restriction/Election dated Oct. 23, 2012.
U.S. Appl. No. 12/684,891, Requirement for Restriction/Election dated Oct. 23, 2012.
U.S. Appl. No. 12/684,892, Requirement for Restriction/Election dated Oct. 9, 2012.
U.S. Appl. No. 12/684,893, Requirement for Restriction/Election dated Oct. 10, 2012.
U.S. Appl. No. 12/684,894, Requirement for Restriction/Election dated Oct. 9, 2012.
U.S. Appl. No. 13/118,369, Requirement for Restriction/Election dated Dec. 13, 2012.
U.S. Appl. No. 13/087,305, Non-Final Office Action dated Aug. 15, 2012.
Warner et al., "Analysis of Tocopherols and Phytosterols in Vegetable Oils by HPLC with Evaporative Light-Scattering Detection," JAOCS, 67(11):827-831 (1990).
Wu et al., "A Comparative Study of Gases Generated from Simulant Thermal Degradation of utotrophic and Heterotrophic Chlorella," Progress in Natural Science, 2(4):311-318, (1992).
Wu et al., "Comparative study on Liposoluble Compounds in Autotrophic and Heterotrophic Chlorella Protothecoides," Acta Botanica Sinica, 35(11):849-858, (1992).
Wu et al., "New Discoveries in Study on Hydrocarbons From Thermal Degradation of Heterotrophically Yellowing Algae," Science in China, 37(3):326-35, (1994).
Yu et al., "Modifications of the metabolic pathways of lipid and triacylglycerol production in microalgae," Microbial Cell Factories, 10:91, (2011). [Retrieved from the Internet Jul. 24, 2012: <URL: http://www.microbialcellfactories.com/content/10/1/91>].
Heredia-Arroyo, et al., Appl. Biochem. Biotech (2010), 162(7), 1978-1995.
Heredia-Arroyo, Wei, Hu—2010—Oil Accumulation via HeterotrophicMixotrophic Chlorella protothecoides(3)-annotated.

Hydrobiologia, 512, 45-48 (2004).
Miao, Wu—2004—High Yield Bio-Oil Production From Fast Pyrolysis by Metabolic Controlling of Chlorella protothecoides-annotated.
Miao, Wu—2006—Biodiesel Production from Heterotrophic Microalgal Oil-annotated.
Milick, et. al., J. Serb. Chem. Soc., 72(5), 451-457.
Moon, et. al., Algal Res. 2(4), 352-357.
O'Grady, et al., Bioproc. Biosys. Eng. 34(1), 121-125.
Omega-3 Fatty Acids and Health—Health Professional Fact Sheet 2005.
Raymundo 2005 date info.
Raymundo 2005 Fat Mimetic Capacity of Chlorella.
Scorletti, et. al., Ann. Rev. Nut, (2103), 33, 231-48.
Shi, et. al., Algae and their Biotechnological Potential(2001), 107-119.
Shi, et. al., Enz. Microb. Tech., 27(3-5); 312-318.
Shi, Jiang, Chen—2002—High-Yield Production of Lutein by the Green Microalga Chlorella protothecoides in Heterotrophic Fed-Batch Cul-annotated.
Talebi, et. al., Mol. Biol. Reports, 40(7), 4421-4428.
UTEX Bristol culture medium.
Wei, et. al., Science in China Life Sercies C, Life Sciences, 51(12), 1088-1093.
Zhang, et. al., J. Ind. Microbiol. Biotech., 23(6), 503-507.
Marshall et al., "Ice cream" Aspen Publication, 2000, pp. 22-31, 24-35, 46-47, 58.
Cook, et al., J. Protozoo. (1967), 14(3), 382-384.
Shetty, et al., Biotech. Bioeng., (1978), vol. XX, 755-766.
Algae in More Bread, The Algae in Lake Bread™, www.meerbrood. com, 3 pages, (2012). [Retrieved from the Internet May 20, 2013: <URL: http:// www.meerbrood.com/algen/>]. (machine translation).
Bristol Medium Directions, UTEX The Culture Collection of Algae, The University of Texas at Austin, 1 page, (2014). [Retrieved from the Internet Aug. 19, 2014: <URL: http://web.biosci.utexas.edu/utex/mediaDetail.aspx?mediaID=29>].
Omega-3 Fatty Acids and Health—Fact Sheet for Health Professionals, NIH Office of Dietary Supplements, 6 pages, (2005). [Retrieved from the Internet Aug. 19, 2014: <URL: http://ods.od.nih.g ov/factsheets/Omega3FattyAcidsandHealth-HealthProfessional/?print=1>].
Adams, "Safe Gluten-Free Food Guide," www.celiac.com, 14 pages, (1995). [Retrieved from the Internet Apr. 4, 2013: <URL: http://www.celiac.com/articles/181/1/Safe-Gluten-Free-Food-List-Safe-Ingredients/Page1.html>].
Amaro et al., "Advances and perspectives in using microalgae to produce biodiesel," Applied Energy, 88:3102-3410, (2011).
Batista et al., "Microalgae bioactive components for innovative food products development," 37th WEFTA Meeting Book of Abstracts, INRB/IPIMAR, Abstract S3.14, p. 134, (2007).
Becker et al., "Micro-algae as a source of protein," Biotechnology Advances, 25:207-210, (2007).
Belasco, "Algae Burgers for a Hungry World? The Rise and Fall of Chlorella Cuisine," Technology and Culture, 38(3):608-634, (1997).
Bognar et al., "Comparative Study of Frying to Other Cooking Techniques Influence on the Nutritive Value," Grasas y Aceites, 49(Fasc. 3-4 ):250-260, (1998).
Butzen et al., "High Oleic Soybean," Crop Insights, 17(17):1-3, (2008). [Retrieved from the Internet Dec. 3, 2008: <URL: http://www.McCormickcompany.net>.
Champagne et al., "Interaction between pH, autolysis promoters and bacterial contamination on the production of yeast extracts," Food Research International, 32:272-583, (1999).
Cook et al., "Photo-Assimilation of Acetate by an Obligate Phototrophic Strain of Euglena gracilis," Publication, J. Protozool., 14(3):382-384, (1967).
Day, Al. et al., "Safety evaluation of a high-lipid algal biomass from Chlorella protorhecoides,"Rego!. Toxicol. Pharmacol., doi:10.1016/lyrtph.2009.06.014, 15 pages, (2009).
De Cock, "Structure development in confectionery products: importance of triacylglycerol composition," Master Thesis, Masters in Bioscience Engineering, Ghent University, 73 pages, (2011).

(56) References Cited

OTHER PUBLICATIONS

Dugar et al., "Relative potential of biosynthetic pathways for biofuels and bio-based products," Nature Biotechnology, 29(12)1074-1078, (2011).
Fradique et al., "Microalgae biomass incorporation in pasta products," 5th Pigments in Food congress—for quality and health, ISBN 978-952-10-4846-3, p. 182, (Aug. 2008). Abstract.
Gouveia et al., "Chlorella vulgaris and Haematococcus pluvialis biomass as colouring and antioxidant in food emulsions," Eur Food Res Technol, 222:362-367, (2006).
Gouveia et al., "Microalgae in Novel Food Products," Food Chemistry Research Developments, Chapter 2, Nova Science Publishers, Inc., ISBN 978-1-60456-262-0, 37 pages, (May 2008).
Gunstone, "Enzymes as biocatalysts in the modification of natural lipids," Journal of the Science of Food and Agriculture, 79:1535-1549, (1999).
Heredia-Arroyo et al., "Oil Accumulation via Heterotrophic/Mixotrophic Chlorella protothecoides," Appl Biochem Biotechnol, 162:1978-1995, (2010).
Hunter et al., "Acute Oral Toxicity to Rats of Green Chlorella and Yellow Chlorella Powders," Huntingdon Research Centre, Huntingdon, England, 5 pages, (1972).
Jacobsen et al., "Applications of Natural Antioxidants in Omega-3 Enriched Foods,"EJEAFChe, 7(8):3288-3295, (2008).
Kamiya, "Effects of Blue Light and Ammonia on Nitrogen Metabolism in a Colorless Mutant of Chlorella," Plant Cell Physiol., 30(4):513-521, (1989).
Kihlberg et al., "Nutritive Value, Effect," The Microbe as a Source of Food, Department of Applied Microbiology, Karolinska Institutet, Stockholm, Sweden, p. 440, (1972).
Krüger, "Kurze Charakteristik einiger niedrerer Organismen im Saftfluss der Laubbaume," Hedwigia, 33: 241-266, (1894). Machine Translation.
Li et al., "Large-scale biodiesel production from microalga Chlorella protothecoides through heterotrophic cultivation in bioreactors," Biotechnology and Bioengineering, 98(04):764-771, (2007).
Lindley, "The impact of food processing antioxidants in vegetable oils, fruits, and vegetables," Trends in Food Science & Technology. 9:336-340, (1998).
Liu et al., "High-oleic canola oils and their food applications," www.aocs.org, 4 pages, (2012). [Retrieved from the Internet Sep. 2012: <URL: http://www.aocs.org>].
Lu, "Biosynthesis and Gene Engineering of Plant Fatty Acids," Chinese Bulletin of Botany, 17(6):481-491, (2000). Abstract only.
Miao et al., "Biodiesel Production From Heterotrophic Microalgal Oil," Biosource Technology, 97(06):841-846, (2006).
Milic et al., "Utilization of baker's yeast (*Saccharamyces cerevisiae*) for the production of yeast extract: effects of different enzymatic treatments on solid, protein and carbohydrate recovery," J. Serb. Chem. Soc., 72(5):451-457, (2007).
Mitsuda et al., Properties of Chlorella cells grown under various photo-heterotrophic conditions, Plant & Cell Physiol, 11:281-292, (1970).
Mitsuda et al., "Protein Isolates From Chlorella Algae, Torula Yeasts, and Hydrocarbon-Assimilating Microorganisms," Nutr. Sci. Vitaminol., 19:1-13, (1973).
Moon et al., "Mixotrophic growth with acetate or volatile fatty acids maximizes growth and lipid production in Chlamydomonas reinhardtii," Algal Research, 2:235-357, (2013).
Nahm, "Quality Characteristics of West African Shea Butter (Vitellaria Paradoxa) and Approaches to Extend Shelf-Life," Master Thesis, Master of Science in Food Service, Rutgers, The State University of New Jersey, 133 pages, (2011).
Nazaruddin et al., "The Effect of Enzymatic Alcoholysis on the Physicochemical Properties of Commercial Cocoa Butter Substitutes," Pakistan Journal of Nutrition, 10(8):718-723, (2011).
O'Grady et al., "Heterotrophic growth and lipid production of Chlorella protothecoides on glycerol," Bioprocess Biosyst Eng, 34:121-125, (2011).
Orthoefer et al., "Performance of trans-free vegetable oils in shortenings and deep-fat frying," Lipid Technology, 17(5):101-106, (2005).
PCT International Search Report and Written Opinion of the International Searching Authority for application PCT/US2013/037261 dated Aug. 23, 2013.
PCT International Search Report for application PCT/US/11/32588 dated Jun. 27, 2011.
PCT International Search Report for application PCT/US09/060692 dated Apr. 22, 2010.
PCT International Search Report for application PCT/US10/31088 dated Jun. 28, 2010.
PCT International Search Report for application PCT/US11/32586 dated Jun. 20, 2011.
PCT International Search Report dated Nov. 6, 2008 for application PCT/US2008/065563.
PCT International Search Report for application PCT/US2011/038464 dated Nov. 3, 2011.
PCT Written Opinion of the International Searching Authority for application PCT/US11/32588 dated Jun. 27, 2011.
PCT Written Opinion of the International Searching Authority for application PCT/US09/060692 dated Apr. 22, 2010.
PCT Written Opinion of the International Searching Authority for application PCT/US10/31088 dated Jun. 28, 2010.
PCT Written Opinion of the International Searching Authority for application PCT/US11/32586 dated Jun. 20, 2011.
PCT Written Opinion of the International Searching Authority dated Nov. 6, 2008 for application PCT/US2008/065563.
Raymundo et al., "Fat mimetic capacity of Chlorella vulgaris biomass in oil-in-water food emulsions stabilized by pea protein," Food Research International, 38:961-965, (2005).
Rizos et al., "Association Between Omega-3 Fatty Acid Supplementation and Risk of Major Cardiovascular Disease Events," JAMA, 308(10):1024-1033, (2012).
Sanchez et al., "Mixotrophic culture of Chlorella pyrenoidosa with olive-mill wastewater as the nutrient medium," Journal of Applied Phycology, 13:443-449, (2001).
Scorletti et al., "Omega-3 Fatty Acids, Hepatic Lipid Metabolism, and Nonalcoholic Fatty Liver Diseas," Annu. Rev. Nutr., 33:231-248., (2013).
Shetty et al., "TEffect of Thiol Reagents on Extractability of Protein from Yeast," Biotechnology and Bioengineering, John Wiley & Sons, Inc., XX:755-766, (1978).
Shi et al., "Heterotrophic production of biomass and lutein by Chlorella protothecoides on various nitrogen sources," Enzyme and Microbial Technology, 27:312-318, (2000).
Shi et al., "High Yield Production of Lutein by Heterotrophic Chlorella Protothecoides in Fed-Batch Systems," Algae and their Biotechnological Potential, Kluwer Academic Publishers, pp. 107-119, (2001).
Shi et al., "High-Yield Production of Lutein by the Green Microalga Chlorella protothecoides in Heterotrophic Fed-Batch Culture," Biotechnol. Prog., 18(4):723-727 (2002).
Sung et al., "The research on the lipid content and composition of microalgae and their impact factors," Marine Science, 12(33)122-128, (2009). (English translation of first two pages).
Szabo et al., "Safety evaluation of a high lipid Whole Algalin Flour (WAF) from Chlorella protothecoides," Regulatory Toxicology and Pharmacology, 63:155-165, (2012).
Szabo et al., "Safety evaluation of Whole Algalin Protein (WAP) from Chlorella protothecoides," Food and Chemical Toxicology, 59:34-45, (2013).
Talbot et al., "Formulation and Production of Confectionery Fats," OH Middle East 2007 Conference and Exhibition, 378 pages, (2007).
Talebi et al., "Genetic manipulation, a feasible tool to enhance unique characteristic of Chlarella vulgaris as a feedstock for biodiesel production," Mol Biol Rep, 40:4421-4428, (2013).
Tasaki et al., "Digestibility of Yellow Chlorella in Suckling Goat Kids," The Japanese Journal of Zootechnical Science, 48(11):661-663, (1977).

(56) References Cited

OTHER PUBLICATIONS

Urano, et al., "Effect of Osmotic Stabilizers on Protoplast Generation of Chlorella ellipsoidea Yellow/White Color Mutants," Journal of Bioscience and Bioengineering, 90(5):567-569, (2000).
Wei et al., "Enhanced production of lutein in heterotrophic Chlorella protothecoides by oxidative stress," Sci China Ser C-Life Sci, 51(12):1088-1093, (2008).
Xiong et al., "High-density fermentation of microalga Chlorella protothecoides in bioreactor for microbio-diesel production," Appl. Microbiol. Biotechnol., 78:29-36, (2008).
Xu et al., "High quality biodiesel production from a microalga Chlorella protothecoides by heterotrophic growth in fermenters," Journal of Biotechnology, 126:499-507, (2006).
Zhang et al., "A kinetic model for lutein production by the green microalga Chlorella protothecoides in heterotrophic culture," Journal of Industrial Microbiology & Biotechnology, 23:503-507, (1999).
Youzhi Jiagong, (Jun. 8, 2007), "Oil Processing Technology (2nd edition)", Chemical Undustry Press, Title page, Publication Page, Table of Contents, pp. 206-213, (in Chinese).
"Linoleic acid and α-linolenic acid are real essential fatty acids", (Mar. 1998), Title page, Publication Page, Table of Contents, Chapter 2: Essential Fatty Acids (pp. 12-13) and Chapter 15: Selection of the most suitable fatty acids (pp. 89-91), with English translation.
Bowman, Barbara A. and Robert M. Russell (eds.), "Present Knowledge in Nutrition" (1st Edition), (Oct. 2004), Title page, Publication Page, Table of Contents, p. 231 (in Chinese).
"Auxenochlorella", article from Wikipedia, Retrieved from the Internet on Mar. 23, 2016, "https://en.wikipedia.org/w/index.php?title=Auxenochlorella&oldid=711518993".
Clore, G.M. and E.M. Chance, A computer analysis of cyanide stimulated oxygen uptake in *Chlorella protothecoides*. (Jul. 1977) FEBS Left. 79 (2):353-356.
"Algen—Nudein ais Altmark Spezialitat (Algae noodles: a speciality from Altmark region)" in German language, and other *Chlorella* Food products, (Oct. 9, 2007), 3 pages.
Imai, Ichiro, et al. "Advanced research on Shellfish poisonings: Current Status and overview", Table of Contents, Chapters 1 and Chapter 4, 11 pages.
"Aoko's toxin", Aichi Prefectural Institute of Public Health, 6 pages. [Retreived from the Internet Oct. 13, 2016: <URL: http://www.pref.aichi.jp/eiseiken/5f/bloom_t.html].
Lee, Yuan-Kun, "Commercial Production of microalgae in the Asia-Pacific rim", Journal of Applied Phycology, 9:403-411, (Oct. 29, 1997).
Kay, Robert A., "Microalgae as Food and Supplement", Critical Reviews in Food Sciense and Nutrition, 30(6):555-573 (Feb. 1991).
Usuki, Riichiro and Luniko Kamata,"Experimental Trials on the Role of Lipids in Good Taste and Good Body of Foods", Research reports of Shokei Gakuin College 53, 2006-05, p. 85-90 (in Japanese with English Abstract).
"Chlorella Photosynthesis—Disctionary", last modified Mar. 23, 2015, Retrevied from the Internet: <URL:(http://photosyn.jp/pwiki/index.php?%E3%82%AF%E3%83%AD%E3%83%AC%E3%83%A9) with English Machines Translation.
Hirashima, Ryuta, "Framework of evaluation on inventive step requirement and significance of 'technical problem'", Patent 2010, 63(5): 34-49 (in Japanese; no translation).
Ullmann, Jorg, "The Difference between *Chlorella vulgaris* and *Chlorella pyrenoidosa*", (2006) (http://www.algomed.de/index.php?op=algenfarm_geschichte).
"History of the algae farm: Chlorella Algae—Roquette Klötze GmbH", [Retreived from the Internet Nov. 25, 2016: <URL: (http://www.algomed.de/index.php?op=algenfarm_geschichte)].
Kirk, J. et al., "Mastitis Control Program for Prototheca Mastitis in Dairy Cows", 6 pages. <<URL: milkquality.wisc.edu/wp=content/uploads/2011/09/mastitis-control-program_prototheca-mastitis.pdf>>.
Oral Summary, dated Nov. 7, 2016, for Invalidation Hearing for Japanese Patent No. 5731982 (in Chinese).

Oral Summary by the Patentee, dated Nov. 29, 2016, for Invalidation Hearing for Japanese Patent No. 5731982 (in Chinese).
USDA National Nutriet Database (https://ndb.nal.usda.gov/ndb/).
Environmental Stresses in Non Mammalian Organisms, p. 29. with English translation.
Letter from Ray Matulka to Paulette Gaynor and Sylvester Mosley, dated Apr. 18, 2013, re: Request to Cease Evaluation of GRN 000450, Letter from Ray Matulka to Paulette Gaynor, dated Apr. 18, 2013, re: High Lipid Chlorella protothecoides S106 Flour GRAS Notification and GRAS Exemption Claim (dated Apr. 18, 2013).
Solazyme Market and Products, (2005).
Letter from Susan Cho to Susan Carlson, dated Jul. 25, 2011 and "RFI's Chlorella vulgaris GRAS Self affirmation (dated Jul. 16, 2010)."
[Retreived from the Internet Oct. 13, 2016: <URL: http://hfnet.nih.gc.jp/contents/detail05.htm] (in Chinese).
"Roquestte Freres, S.A. and Solazyme, Inc. Agree to Dissolve Microalgae Join Venture", (Jun. 24, 2013) Press Release, Lestrem, France.
Standard Tables of Food Composition in Japan 2015 (Seventh Revised Edition), Table of Fatty Acid Composition, Edited by The Council for Science and Technology, the Ministry of Education, Culture, Sports, Science and Technology, (available from http://www.mext.go.jp/a_menu/syokuhinseibun/1365295.htm) [Retreived from the Internet Oct. 12, 2016: <URL: (http://www.algomed.de/index.php?op=algenfarm_geschichte)] http://www.geocities.jp/jr2bvb/syokuhin/sibousan/oil_s.htm].
"'Taste' of Lipids?" [retreived from the Internet Oct. 12, 2016: <URL: (https://sites.google.com/site/coffeetambe/coffeescience/physiology/taste/fat] with English Machine Translation.
Japanese Laid-Open Publication No. 2000-175680 (translator's note: an English language member of the same patent family: EP 1142985 (A1)).
Japanese Laid-Open Publication No. 2002-223787 (translator's note: no English language counterpart could be located).
http://mcc.nies.go jp/strainList.do?strainId=2555&condition=Auxenochlorella+protothecoides.
http://mcc.nies.go jp/strainList.do?strainId=2568&condition=Auxenochlorella+protothecoides.
*Roquette Freres S.A.* v. *Solazyme Inc.*, Delaware District Court, Case No. 1:14-cv-01442 District Judge Sue L. Robinson, presiding, Solazyme, Inc.'s Answer to Plantiff Roquette Freres, S.A.'S Complaint, Petition to Confirm Arbitration Award and Counterclaims, filed Feb. 26, 2015, 29 pages.
Joint Venture and Operating agreement of Solazyme Roquette Nutritionals, LLC., copy dated Nov. 7, 2015.
*Solazyme, Inc.* vs. *Roquette Freres, S.A.*, Arbitration Award, dated Feb. 19, 2015.
Request for Invalidation, dated Jan. 7, 2015, for Chinese Patent Application No. 200980149978.1, 21 pages (in Chinese).
Supplemental Statement for Request for Invalidation, dated Dec. 2, 2015, for Chinese Patent Application No. 200980149978.1, 35 pages (in Chinese), including the list of submitted Counter Evidences on p. 1-2.
Notification of Acceptance of Request for Invalidation, dated Jan. 28, 2016, for Chinese Patent Application No. 200980149978.1, 4 pages (in Chinese).
Documents filed by the Petitioner—Part II, dated Apr. 29, 2015, for Chinese Patent Application No. 200980149978.1, 21 pages (in Chinese), including : Jia, Xuan, et al., "Removal of Total nitrogen form wastewater dischrage from a chemical pertilizer plant by Chlorella protothecoides USTB-01", Chinese Journal of Environmental Engineering, (Apr. 2010), 4(4):737-740 (in Chinese).
Documents filed by the Petitioner—Part III, dated May 5, 2015, for Chinese Patent Application No. 200980149978.1, 21 pages (in Chinese), including : , including : Singelton Paul and Diana Sainsbury, "Dictionary of Microbiological and Molecular Biology, (3rd Ed. 2006)", pp. 155 (and Chinese translation thereof) Singelton Paul and Diana Sainsbury, "Dictionary of Microbiological and Molecular Biology, (2nd Ed. 1987)", pp. 178-179 (and Chinese translation therof).
Statement of Grounds & Particulars of Opposition, Grounds for Opposition, in the matter of Australian Patent Application No.

(56) References Cited

OTHER PUBLICATIONS 2009303354 in the name of Solazyme, Inc. and Opposition by *Roquette Frères, S.A.* v. *Solazyme, Inc.*, Commonweath of Ausralia, Mar. 3, 2016, (21 pages).
Declaration of Michael Armin Borowitzka in the matter of Australian Patent Application No. 2009303354 in the name of Solazyme, Inc. and Opposition by *Roquette Frères, S.A.* v. *Solazyme, Inc.*, Commonwealth of Ausralia, Jun. 2, 2016, (32 pages).
Exhibit MB-1, Federal Court of Australia, Practice Note CM7, Expert Witnesses in Proceedings on the Federal Court of Australia, commenes Jun. 4, 2013 Exhibit MB-2, Michael Armin Borowitzka Curriculum Vitae Exhibit MB-3, J. M. Hundley, R. B. Ing and R. W. Krauss, "Algae as Sources of Lysine and Threonine in Supplementing Wheat and Bread Diets", Science, New Series, vol. 124, No. 3221 (Sep. 21, 1956), pp. 536-537. Exhibit MB-4, Krauss, Robert W., "Mass Culture of Algae for Food and Other Organic Compounds," American Journal of Botany, vol. 49, No. 4 (Apr. 1962), pp. 425-435. Exhibit MB-5, Lee, Yuan-Kun, "Commercial Production of microalgae in the Asia-Pacific rim", Journal of Applied Phycology, 9:403-411, (Oct. 29, 1997) Exhibit MB-6, Soong, Pinnan, "Productions and Development of Chlorella and Spirulina in Taiwan", *Algae Biomass: Production and Use*, Gedaliah Shelef and Carl J. Soeder (eds.), North-Holland Biomedical Press, (Dec. 1980), pp. 97-113 and title and copyright page. Exhibit MB-7, Kawaguchi, Kotaro, "Microalgae Production Systems in Asia", *Algae Biomass: Production and Use*, Gedaliah Shelef and Carl J. Soeder (eds.), North-Holland Biomedical Press, (Dec. 1980), pp. 25-33 and title and copyright page. Exhibit MB-8, Kay, Robert A., "Microalgae as Food and Supplement", Critical Reviews in Food Science and Nutrition, 30(6):555-573 (Feb. 1991). Exhibit MB-9, Raymundo et al., "Fat mimetic capacity of Chlorella vulgaris biomass in oil-in-water food emulsions stabilized by pea protein," Food Research International, 38:961-965, (Feb. 25, 2005). Exhibit MB-10, Samejima, H. and J. Myers, "On the Heterotrophic Growth of Chlorella pyrenoidosa", J. Gen Microbiol, (1958), 18:107-117.
Exhibit MB-11, Aoki, Shigeji and Eiji Hase, "De- and Re-Generation of Chloroplasts in the Cells of Chlorella Photothecoides", Plant & Cell Physiol, (Sep. 5, 1964), vol. 5, pp. 473-484 [Retreived from the internet on Jun. 7, 2013 from http://pcp.oxfordjournals.org/ by Reprints Desk ]. Exhibit MB-12, Becker, E.W., "Micro-algae as a source of protein," Biotechnology Advances, 25:207-201, (Mar.-Apr. 2007). Exhibit MB-13, Iwamoto, Hiroaki, "Industrial Production of Microalgal Cell-mass and Secondary Products—Major Industrial Species Chlorella", Chapter 11, Handbook of Microalgal Culture: Biotechnology and Applied Phycology, Amos Richmond (eds), (Dec. 1, 2003), pp. 255-263. Exhibit MB-14, Petkov et al., "Which are fatty acids of the green alga Chlorella?," Biochemical Systematics and Ecology, 35:281-285, (2007). Exhibit MB-15, Gladu, Patricia K., et al. "Sterol, Fatty Acid and Pigment Characteristics of UTEX 2341, a Marine Eustigmatophyte Identified Preivously as Chlorella Minutissuma (Chlorophyceae)" J. Phycol., (Jun. 21, 1995), 31:774-777. Exhibit MB-16, Xu et al., "High Quality Biodiesel Production From a Microalga Chlorella Photothecoides by Heterotrophic Growth in Fermenters," Journal of Biotechnology, 126(4):499-507, (May 2006). Exhibit MB-17, Matsuka et al., "Changes in Contents of Carbohydrate and Fatty Acid in the Cells of Chlorella Protothecoidesduring the process of De- and Re-Generation of Chloroplasts," Plant and Cell Physiol., 7:651-662 (Sep. 24, 1966). Exhibit MB-18, Xuan, J. et al., "Removal of total nitrogen from wastewater discharge from a chemical fertilizer plant by Chlorela protothecoides USTB-01", Chinese Journal of Environmental Engineering, (Apr. 2010), vol. 4, No. 4, pp. 737-740.
Exhibit MB-19, Australian Application No. 2009303354B2 from International Patent Application No. PCT/US2009/060692, naming Solazyme, Inc., International Patent Publication No. 2010/045368, dated Apr. 22, 2010. Exhibit MB-20, Pabst, W., "Nutritional evaluation of nonsewage microalgae by the rat balance method," Arch. HyrobioL Beih, (Dec. 1978), pp. 65-70. Exhibit MB-21, Urano, et al., "Effect of Osmotic Stabilizers on Protoplast Generation on Chlorella ellipsoidea Yellow/White Color Mutants", Journal of Bioscience and Bioengineering, vol. 90, No. 5, 567-569, (2000). Exhibit MB-22, Kamiya, "Effects of Blue Light and Ammonia on Nitrogen Metabolism in a Colorless Mutant of Chlorella", Plant Cell Phyiol., 30(4):513-521 (1989) Exhibit MB-23, Biello et al., "Biofuel of the Future: Oil from Algae," Scientific American, 2 pages, (Jan. 9, 2008).
Evidence in Support, in the matter of Australian Patent Application No. 2009303354 in the name of Solazyme, Inc. and Opposition by *Roquette Frères, S.A.* v. *Solazyme, Inc.*, Commonweath of Ausralia, Jun. 3, 2016, (1 page).
Declaration of Young J. Suh In the matter of Australian Patent Application No. 2009303354 in the name of Solazyme, Inc. and Opposition by *Roquette Frères, S.A.* v. *Solazyme, Inc.*, Commonweath of Ausralia, Aug. 31, 2016, (94 pages) Exhibit YS1, Arbitration Award, Solazyme Inc. vs. Roquette Frères, Case 1:14-cv-01442-SLR, Document 153, Filed Dec. 21, 2015 Exhibit YS2, French Patent Publication No. FR 2 924 126, filed Nov. 28, 2007. Exhibit YS3, Memorandum Opinion, Document 153, *Roquette Frères, S.A.* vs. *Solazyme Inc.*, Case 1:14-cv-01442-SLR, filed Dec. 21, 2015.
Declaration of Craig Patch in the matter of Australian Patent Application No. 2009303354 in the name of Solazyme, Inc. and Opposition by *Roquette Frères, S.A.* v. *Solazyme, Inc.*, Commonweath of Ausralia, Sep. 5, 2016, (22 pages) Exhibit CP-1, Federal Court of Australia, Practice Note CM7, Expert Witnesses in Proceedings on the Federal Court of Australia, commenes Jun. 4, 2013. Exhibit CP-2, Craig Patch Curriculum Vitae.
Declaration of Craig Patch in the matter of Australian Patent Application No. 2009303354 in the name of Solazyme, Inc. and Opposition by *Roquette Frères, S.A.* v. *Solazyme, Inc.*, Commonweath of Ausralia, Sep. 28, 2016, (42 pages). Exhibit CP3, Record of Views Formed in Response to Inquires, updated Mar. 2015 (20 pages) Exhibit CP4, Huss, V.A.R., et al., "Biochemical Taxonomy and Molecular Phylogeny of the Genus Chlorella Sensu Lato (Chlorophyta)1", J. Phycol. 35, 587-598 (Jan. 15, 1999).
Evidence in Answer, in the matter of Australian Patent Application No. 2009303354 in the name of Solazyme, Inc. and Opposition by *Roquette Frères, S.A.* v. *Solazyme, Inc.*, Commonweath of Ausralia, Sep. 29, 2016, (1 page).
Declaration of Michael Armin Borowitzka In the matter of Australian Patent Application No. 2009303354 in the name of Solazyme, Inc. and Opposition by *Roquette Frères, S.A.* v. *Solazyme, Inc.*, Commonwealth of Ausralia, Dec. 21, 2016, (14 pages).
Evidence in Reply, In the matter of Australian Patent Application No. 2009303354 in the name of Solazyme, Inc. and Opposition by *Roquette Frères, S.A.* v. *Solazyme, Inc.*, Commonwealth of Ausralia, Dec. 23, 2016, (1 page).
"Roquette's Microalgae High Lipid Algal Flour Wins Most Innovative Food Ingredient at the 2013 Fi Europe Excellence Award," www.PRnewswire.com/news-release/roquettes-migroalgae-high-lipid-algal-flour-wins-most-innovative-food-ingredient-at-the-2013-fi-europe-excellence-awards, (Nov. 25, 2013), pp. 1-5.
Freshwater Algae Culture Collection at the Institute of Hydrobiology (FACHB-collection), certification letter by the Chinse Academy of Science, "Chlorella vulgaris", (No Date).
Zhou, Lian-ning et al. "Effects of Environmental Factors on Nitrogen and Phosphorus Removal by *Chlorella volaris* in Wastewater", Current Biotechnology, (Jan. 25, 2015), vol. 5, No. 1, Title page, Publication Page, Table of Contents (I Chinese and English), pp. 60-65, with English abstract.
"Chlorella—Chlorella Powder—Nuts.com", [Retreived from the Internet May 2, 2016: <URL: (https://nuts.com/cookingbaking/powders/chlorella/powder.html)].
Aguirre et al., "Engineering challenges in biodiesel production from microalgae," Critical Reviews in Biotechnology, 33(3): 293-308, (2013).
Aoki, Shigeji and Eiji Hase, "De- and Re-Generation of Chloroplasts in the Cells of *Chlorella Protothecoides* ", Plant & Cell Physiol, (Sep. 5, 1964), vol. 5, pp. 473-484 [Retreived from the internet on Jun. 7, 2013 from http://pcp.oxfordjournals.org/ by Reprints Desk ].
Batista et al., "Novel foods with microalgal ingredients—Effect of gel setting conditions on the linear viscoelaaticity of Spirulina and

(56) References Cited

OTHER PUBLICATIONS

Haematococcus gels," Journal of Food Engineering, vol. 110 (May 2012), pp. 182-189, http://www.sciencedirect.com/science/article/pii/S0260877411003001.
Bhunia et al., "Algal Biodiesel Production: Challenges and Opportunities," Bioenergy and Biofuel from Biowastes and Biomass, American Society of Civil Engineers, pp. 313-345, (2010).
Biello et al., "Biofuel of the Future: Oil from Algae," Scientific American, 4 pages, (Jan. 9, 2008). [Retrieved from the Internet Mar. 9, 2015: <URL: http://www.scientificamerican.com/article/biofuel-of-the-future/>].
Borowitzka, Michael A., "Microalgae as sources of pharmaceuticals and other biologically active compounds", Journal of Applied Phycology, (Feb. 1995), vol. 7, Issue 1, pp. 3-15.
Cartens et al., "Eicosapentaenoic Acid (20:5n-3) from the Marine Microalga Phaeodactylum tricornutum," Journal of the Americam Oil Chemists' Society, 73(8):1025-1031, (1969).
Chen et al., "High cell density culture of microalgae in heterotrophic growth," Trends in Biotechnology, 14:421-426, (1996).
Cohen et al., "The Heterotrophic Connection in a Photoautotrophic Chlorella Vulgaris Dominant in Waste Water Oxidation Ponds," War. Sci. Tech., 27(7-8):151-155, (1993).
Demirbas et al., "Importance of algae oil as a source of biodiesel," Energy Conversion and Management, 52:163-170, (2011).
Fang et al., "On Measurement of Food Powder Reconstitution Properties," Drying Technology, 26:3-14, (2008).
Fernandez-Reiriz et al., "Biomass Production and Variation in the Biochemical Profile (Total Protein, Carbohydrates, RNA, Lipids and Fatty Acids) of Seven Species of Marine Microalgae," Aquaculture, 83:17-37, (1989).
Fradique et al., "Incorporation of Chlorella vulgaris and Spirulina maxima biomass in pasta products. Part 1: Preparation and evaluation", Journal of the Science of Food and Agriculture, (May 13, 2010), vol. 90., Iss. 10, pp. 1656-1664.
Fukuda et al., "Biodiesel Fuel Production by Transesterrification of Oils," J. Biosci. Bioeng., 92(5):405-416, (2001).
Gao, Chunfang et al., "Rapid quantitation of Lipid in Microalgae by time-domain nuclear magnetic resonance", Journal of Microbiological Methods 75 (Jul. 25, 2008) 437-440.
Gouveia et al., "Microalgal biomass as a sustainable alternative raw material," Argo Food Industry Hi-Tech, Teknoscience, 7(3):29-34, (Jan. 1, 1996).
Grima et al., "Recovery of Microalgal Biomass and Metabolites: Process Options and Economics", Biotechnology Advances, (2003) 20:491-515.
Guil-Guerrero et al., "Functional properties of the biomass of three microalgal,"Journal of Food Engineering, 65(4):511-517, (Dec. 1, 2004).
Guiry et al., "How Many Species of Algae are There?" J. Phycol., 48:1057-1063, (2012).
Haas et al., "The General Applicability of in Situ Transesterification for the Production of Fatty Acid Esters from a Variety of Feedstocks," J Am Oil Chem Soc, 84:963-970, (2007).
Hidaka et al., "A Hot Water Extract of Chlorella pyrenoidosa Reduces Body Weight and Serum Lipids in Ovariectomized Rats," Phytotherapy Research, 18:164-168, (2004).
Hillen et al., "Hydrocracking of the Oils of Botryococcus braunii to Transport Fuels," Biotechnology and Bioengineering, 24(1):193-205, (1982).
Hörtensteiner et al., "Chlorophyll breakdown in Chlorella protothecoides: characterization of degreening and cloning of degreening-related genes," Plant Molecular Biology, 42:439-450, (2000).
Hu et al., "Microalgal Triacylglycerols as Feedstocks for Biofuel Production: Perspectives and Advances," The Plant Journal 54:621-639, (2008).
Huber et al., "Production of Liquid Alkanes by Aqueous-Phase Processing of Biomass-Derived Carbohydrates," Science, 308:1446-1450, (2005).

Huber et al., "Synthesis of Transportation Fuels from Biomass: Chemistry, Catalysts, and Engineering," Chem. Rev., 106: 4044-4098, (2006).
Husic et al., "Effect of Osmotic Stress on Carbon Metabolismin Chlamydomonas reinhardtii," Plant Physioi., 82:594-596, (1986).
Inoue et al., "Analysis of oil derived from liquefaction of Botryococcus Braunii," Biomass and Bioenergy, 6(4):269-274, (1994).
Jong-Yuh et al., "Potential hypoglycemic effects of Chlorella in streptozotocin-induced diabetic mice," Life Sciences, 77:980-990 (2005).
Journal of Nanjing University, Natural Sciences Edition, (Oct. 29, 1993), vol. 29, No. 4, pp. 622-620 (with English Translation).
Kanellos, "Algae: Another way to grow edible oils," CNET News, 6 pages., (Jan. 25, 2008). [Retrieved from the Internet Mar. 9, 2015: <URL: http://news.cnet.com/Algae-Another-way-to-grow-edible-oils/2100-11395_3-6227572.html?tag=nefd.lede>].
Klosty et al., "Sterols of Algae. The Occurrence of Ergosterol in Chlorella Pyranoidosa," J. Am. Chem. Soc., Notes, 74(6):1601-1601, (1952).
Knothe, "'Designer' Biodiesel: Optimizing Fatty Ester Composition to Improve Fuel Properties," Energy & Fuels, 22:1358-1364, (2008).
Knothe, "Analyzing Biodiesel: Standards and Other Methods," JAOCS, 83(10):823-833, (2006).
Krauss, Robert W., "Mass Culture of Algae for Food and Other Organic Compounds," American Journal of Botany, vol. 49, No. 4 (Apr. 1962), pp. 425-435.
Kris-Etherton et al., "Monounsaturated Fatty Acids and Risk of Cardiovascular Disease," Circulation, 100:1253-1258, (Jan. 1, 1999).
Kyle, David, "Production and Use of Lipids from Microalgae", *Microalgal Lipids*, Lipid Technology, (May-Jun. 1992), pp. 59-64.
Leema et al., "Heterotrophic Production of Lutein and Biomass by Chlorella Vulgaris with Different Nitrogen Sources," Algae Biofuel, Studium Press (India) Pvt. Ltd., pp. 91-101, (2011).
Marshall et al., "Ice Cream", (Aug. 31, 2000), Aspen Publishers, Gaithersburg, MD, USA, pp. 22-31, 24-35, 46-47 and 58.
Matsuka et al., "Changes in Contents of Carbohydrate and Fatty Acid in the Cells of *Chlorella Protothecoides*during the process of De- and Re-Generation of Chloroplasts," Plant and Cell Physiol., 7:651-662 (Sep. 24, 1966).
Matsuka et al., "The Role of Respiration & Photosynthesis in the Chloroplast Regeneration in the Glucose-Bleached Cells of Chlorella Protothecoides," Plant and Cell Physiol., 7:149-162 (1966).
Mizoguchi et al., "Nutrigenomic Studies of Effects of Chlorella on Subjects with High-Risk Factors for Lifestyles-Related Disease," Journal of Medicinal Food, 11(3):395-404, (2008).
Neish et al., "Carbohydrate Nutrition of Cholorella Vulgaris," Canadian Journal of Botany, 29:68-78, (1951).
Pandey, Ashok, Duu-Jong Lee, Yusuf Chisti and Carlos Soccol (eds.), "Factors Affecting Heterotrophic Production of Algal Oils", *Biofuels from Algae*, 1st Edition, eds. (Oct. 7, 2013), pp. 119-123.
Parikh et al., "Role of Spirulina in the Control of Glycemia and Lipidemia in Type 2 Diabetes Mellitus," Journal of Medicinal Food, 4(4):193-199, (2001).
Pratoomyot et al., "Fatty acids composition of 10 microalgal species," Songklanakarin J. Sci. Technol., 27(6):1179-1187, (2005).
Qingyu et al., "Fine Cell Structure and Biochemical Compositions of Chlorella Protothecoides after Transferring from Autotrophic to Heterotrophic Metabolism," Journal of Nanjing University, Natural Sciences Edition, 29(4):622-630, (1993). Abstract.
Radmer et al., "Commercial applications of algae: opportunities and constraints," Journal of Applied Phycology, 6:93-98, (Apr. 1, 1994).
Rasmussen, R and Michael T. Morrissey, "Marine Biotechnology for Production of Food Ingredients", Advances in Food and Nutition Reseach, vol. 52, (2007), pp. 237-292.
Running et al., "Extracellular production of L-ascorbic acid by Chlorella protothecoides, Prototheca species, and mutants of P. moriformis during aerobic culturing at low pH," Journal of Industrial Microbiology & Biotechnology, 29:93-98, (2002).
Running et al., "Heterotrophic production of ascorbic acid by microalgae", Journal of Applied Phycology, (Apr. 1994), vol. 6, Issue 2, pp. 99-104.

(56) References Cited

OTHER PUBLICATIONS

Samarasinghe, Nalin, et al., "Algal cell rupture using high pressure homogenization as a prelude to oil extraction", Renewable Energy, vol. 48, Dec. 2012, pp. 300-308.

Sansawa et al., "Production of Intracellular Phytochemicals in Chlorella under Heterotrophic Conditions," Journal of Bioscience and Bioengineering, 98(6):437-444, (2004).

Sawayama et al., "Possibility of renewable energy production and CO2 mitigation by thermochemical liquefaction of microalgae," Biomass and Bioenergy, 17(1):33-39, (1999).

Shi et al., "Production and rapid extraction of lutein and the other lipid-soluble pigments from Chlorella protothecoides grown under heterotrophic and mixotrophic conditions," Nahrung, 43:109-113, (1999).

Shi, et al., "Production of biomass and lutein by Chlorella protothecoides at various glucose concentrations in heterotrophic cultures ," Process Biochemistry, 34:341-347, (1999).

Shihira-Ishikawa et al., "Nutritional Control of Cell Pigmentation in Chlorella Protothecoides With Special Reference to the Degeneration of Chloroplast Induced by Glucose," Plant and Cell Physiology, 5(2):227-240 (Jan. 1, 1964), [online abstract], Retrieved on Jun. 3, 2010 from http://pcp.oxfordjounals.org/cgi/content/abstract/5/2/227.

Tomomi Tsutsui, et al., "Effect of Seaweed Substitution on Breadmaking (I) Chlorella," Proceedings of Seitoku Junior College of Nutrition, 2004, (35), pp. 1-7.

Zhao et al., "Medium optimization for lipid production through co-fermentation of glucose and xylose by the oleaginous yeast Lipomyces starkeyi," Eur. J. Lipid Sci. Technol., 110:405-412, (2008).

Amaro, et al., Appl. Energy 88(10), 3402-3410.

Batista 2007 Microalgae bioactive components for innovative food product development.

Champagne, et al., Food Res. Int. (1999) 32, 575-583.

Chap. 2 2008 Microalgae in Novel Food Products.

Chapt 2, 2008 Publication date info.

Dugar, Stephanopolous, (2011) Nat. Biotechnol. 29, (12), 1074-1078.

Evangelos, et al., JAMA 308, (10), 1024-1033.

Fradique 2008 5th Pigments in food, collected.

Gouveia and Haematoccus pluvialis biomass as colouring and antioxdiant in food emulsions, Eur Food Res Technol (2006) 222:362-367.

* cited by examiner

MICROALGAL FLOUR

CROSS-REFERENCE TO RELATED APPLICATION

This application claims priority under 35 U.S.C. § 119(e) to U.S. provisional application No. 61/757,534, filed Jan. 28, 2013, the entire contents of which is hereby incorporated by reference.

TECHNICAL FIELD

The present invention relates to microalgal food products with improved flavor and methods of producing the food products.

BACKGROUND

As the human population continues to increase, there is a growing need for additional food sources, particularly food sources that are inexpensive to produce but nutritious. Moreover, the current reliance on meat as the staple of many diets, at least in the most developed countries, contributes significantly to the release of greenhouse gases. There is a need for new foodstuffs that are less harmful to the environment to produce.

Requiring only "water and sunlight" to grow, algae have long been looked to as a potential source of food. While certain types of algae, primarily seaweed, do indeed provide important foodstuffs for human consumption, the promise of algae as a foodstuff has not been fully realized. Algal powders made with algae grown photosynthetically in outdoor ponds or photobioreactors are commercially available but have a deep green color (from the chlorophyll) and a strong, unpleasant taste. When formulated into food products or as nutritional supplements, these algal powders impart a visually unappealing green color to the food product or nutritional supplement and have unpleasant fish, seaweed or other flavors.

There are several species of algae that are used in foodstuffs today, most being macroalgae such as kelp, purple laver (*Porphyra*, used in nori), dulse (*Palmaria palmate*) and sea lettuce (*Ulva lactuca*). Microalgae, such as Spirulina (*Arthrospira platensis*) are grown commercially in open ponds (photosynthetically) for use as a nutritional supplement or incorporated in small amounts in smoothies or juice drinks (usually less than 0.5% w/w). Other microalgae, including some species of *Chlorella* are popular in Asian countries as a nutritional supplement.

Poor flavor is a major factor that has impeded the widespread adoption of microalgae in food. WO2010/12093 discloses methods of making and using microalgal biomass as a food. That reference discloses the growth of microalgae in the dark, to produce a microalgal biomass. However, further improvements in flavor of microalgal biomass should promote further adoption.

SUMMARY

The present invention relates to microalgal food products with acceptable sensory characteristics and methods of producing the food products. The flour can be produced by cultivating microalgal cells of a strain of *Chlorella protothecoides* under conditions of acceptable pH and dissolved oxygen to produce a desired amount of lipid. The microalgal cells can be lysed, heat-treated, washed and dried to produce a microalgal flour that can be incorporated into a variety of products.

In one embodiment of the present invention, a microalgal flour suitable for use in food is provided, the flour comprising microalgal cells of *Chlorophyta*, wherein analysis by SPME according to Example 4 and SBSE according to Example 5 to determine concentrations of the compounds of Example 6 relative to an internal standard, followed by analysis according to the procedure of Example 9 produces a flavor descriptor that falls within the ellipsoid of Example 8 defining 3 standard deviations relative to the positive flavor cluster corresponding to the closed circles in the graph of FIG. 2.

The aforementioned microalgal flour is obtainable in one embodiment of the present invention, by the process of cultivating a broth of cells of *Chlorella protothecoides* in the dark in the presence of glucose as a fixed carbon source with a starting pH of 6.8, while maintaining the dissolved oxygen level above 30%, subjecting the broth to a high-temperature-short-time process of 75° C. for 1 minute, harvesting the cells by centrifugation with a dilution of 6.4 fold in water, lysis of the cells by milling, adding an antioxidant, and drying using a spray-dry nozzle outputting to a moving belt.

BRIEF DESCRIPTION OF THE DRAWINGS

The features of the invention will be more readily understood by reference to the following detailed description, taken with reference to the accompanying drawing, in which.

DETAILED DESCRIPTION OF EMBODIMENTS OF THE INVENTION

Definitions

In connection with a culture medium, "dissolved oxygen," abbreviated as "DO" means the relative oxygenation of the culture medium as compared to the oxygenation of a culture medium that is in oxygen equilibrium with the atmosphere.

A "microalgal flour" is a dry, particulate composition, fit for human consumption, comprising cells of microalgae.

As used herein, an "off-flavor" means a flavor that a consumer would not expect and/or is undesired in a food, for example a baked food, such as a cake. Examples of off-flavors include flavors of cabbages or fish. Although specific flavors may be measured by modern analytical techniques such as Gas Chromatography-Mass Spectrometry (abbreviated as GC-MS), often the most convenient and effective tool for measuring off-flavors is a tasting panel comprised of humans. In connection with human perception of off flavors, these may be determined by a sensory panel of, for example, 10 people, where absence of a flavor or odor is established when 2 or fewer of the 10 people can detect the flavor, or by performing enough tests to establish statistical significance.

Overview

The present invention is rooted in the discovery that certain strains of microalgae can produce an appetizing biomass in terms of flavor, odor and color, when cultivated and processed under particular conditions. The improved flavor is believed to result not just from the absence of off-flavors but from the presence of desirable flavor compounds produced during cultivation and/or processing. In the Examples below, the microalgae is a strain of *Chlorella protothecoides* cultivated heterotrophically, in the dark, but could be another species of *Chlorella* or other species of *Chlorophyta*, provided that a non-green color can be produced via heterotrophic cultivation and careful processing such as by using the methods given below. By use of these techniques, the product may fall within the newly identified acceptability criterion disclosed here.

Human sensory panel data on multiple batches of microalgal flour was correlated with data from an extensive analysis of flavor and odor compounds of varying solubility in water to identify a clustering in flavor/odor space as represented by a principal component analysis. Thus, a microalgal flour that falls within the identified cluster has a high probability of being acceptable for human consumption.

Figure 1:
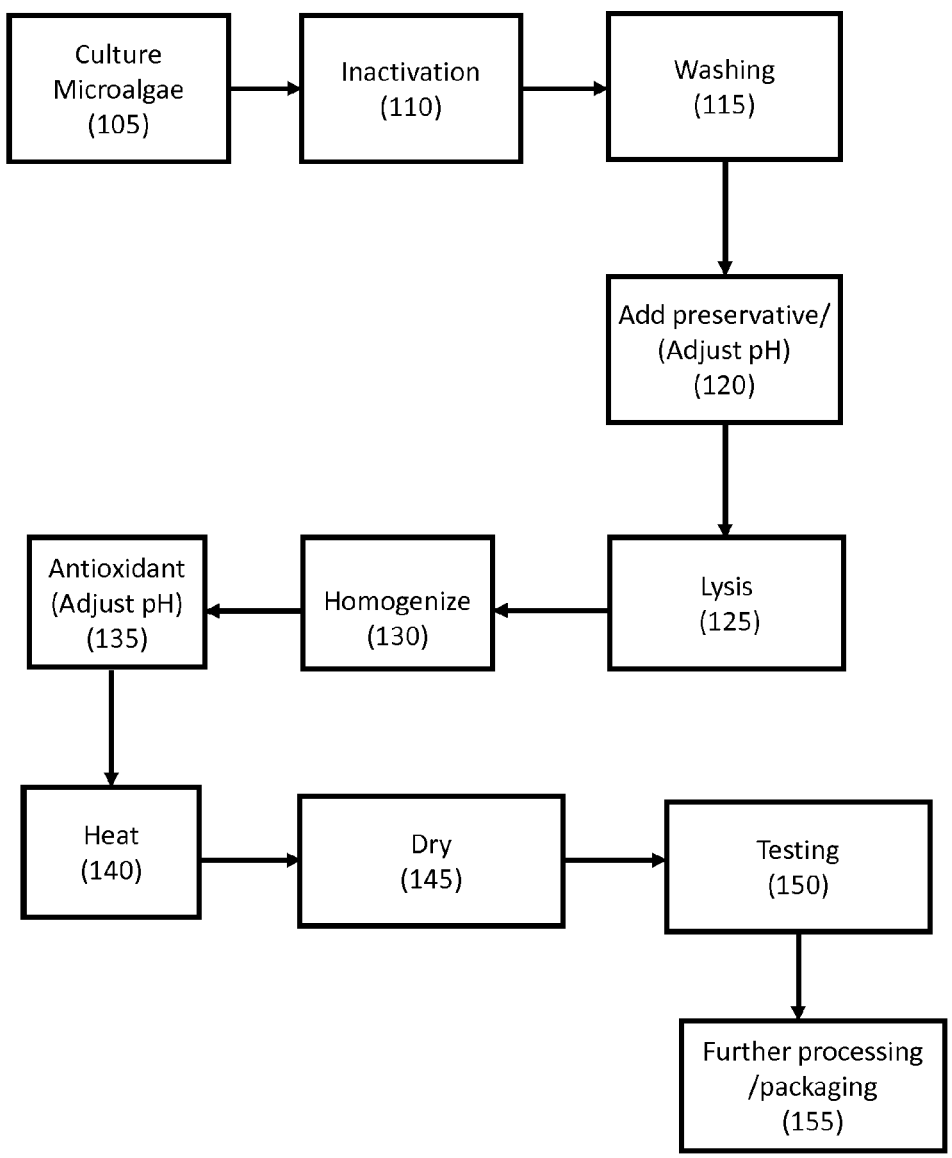
FIG. 1 shows a flow diagram depicting a method of producing a food product in accordance with an embodiment of the present invention.

FIG. 1 is a flow diagram of a process for producing microalgal flour having low amounts of off-flavors, in accordance with embodiments of the invention. The resulting flour may be incorporated into a variety of foods and beverages.

Production of Improved Microalgal Flour

Microalgae are cultured (step 105). It has been found that culturing the microalgae in the dark creates microalgal biomass having lower levels of off-flavors such as mushroom and cabbage or fish flavors; e.g., when microalgal flour dispersed in deionized water at 10% (w/v), and evaluated by a human sensory panel. Thus, in a preferred embodiment, the microalgae are cultured heterotrophically, in the dark on a fixed (i.e. non-$CO_2$) carbon source. While glucose was used in the examples below, other fixed carbon sources such as fructose, sucrose/fructose mixtures, or acetic acid/acetate may produce comparable results. The sugar concentration can be controlled by continuous feeding. Favorable results have been achieved with a glucose concentration of between 3 and 10 g/l. Suitable genera of microalgae include *Chlorella* and *Protetheca*. For example, *Chlorella protothecoides*, *Prototheca moriformis* or *Prototheca zopfii* may be used. Other species of *Chlorella* used for human nutrition, such as *Chlorella protothecoides* can also be grown and processed as disclosed here. Combinations of microalgal species or strains may also be used. Optionally, the microalgal cells are mutated and a strain selected to be substantially reduced in pigment that may change the color of a food product into which the biomass is incorporated. In the examples below, it was found that suitable flavor and no observable green color could be obtained from cells of *Chlorella protothecoides*. For example, the flour may comprise less than 200, 20, or 2 ppm of chlorophyll. In the examples below, the color was found to be yellow/gold, but could also be, for example, pale-yellow, off-white, or white depending on the strain and cultivation/processing conditions used.

The microalgae are cultured to a desired density and lipid concentration. The lipid concentration may be increased by culturing under nutrient-limiting and especially nitrogen-limiting conditions. In embodiments of the invention, culturing is performed under conditions of limiting nitrogen so that the microalgae reach 10-20%, 20-30% 40-50%, 40-60%, 30-70%, 35-75%, 50-60%, 60-70%, or 70-85% lipid, as measured by dry cell weight. In the exemplified embodiments, the microalgae comprise about 50% lipid. Elevated levels of lipid are especially useful in producing food products with improved fat and cholesterol profiles or improving the mouthfeel of such products. When a high lipid microalga is used to produce the flour, the stickiness of the lipid can be an impediment to forming a flour that is measurable and/or flowable. Alternately, cultivation under nitrogen-replete conditions can give a high-protein microalgal flour, such as flour can have, for example 5-20% or 10-18% lipid by dry cell weight. As described below, drying methods have been identified that give a flowable powder while retaining the desirable taste, odor and color characteristics.

The microalgae may be cultured in an opaque culture vessel. The microalgae may be cultured under aerobic conditions. Surprisingly, it has been found that increasing the oxygen level to 30% DO or more during heterotrophic culture of *Chlorella protothecoides* can result in a microalgal biomass having improved flavor. Variation of ±30% in DO (i.e., 30±9% DO) is contemplated. In addition, elevated oxygen (e.g., >40% DO, >50% DO, >60% DO, or 60-70% DO) during fermentation can result in a microalgal biomass having a white or off-white color with low amounts of off-flavors. Whiteness may be measured with a Hunter colorimeter. In an embodiment, the whiteness is greater than the whiteness of a control sample of microalgal biomass grown at about 30-40% DO. In a specific embodiment, the oxygen is elevated to about 60-70% dissolved oxygen. Increased oxygenation can be achieved, for example, by the introduction of purified oxygen.

The flavor may be improved by culturing the microalgae at a desired pH. For example, the pH could be from 4 to 9, or from 5 to 8. The pH may be controlled using buffering and/or pH monitoring with titration. If an acidic pH is used, the pH can be neutralized by adjusting to a pH of 6 to 8 or 6.5 to 7.8, or about 7; e.g., prior to drying to avoid astringent flavor. The final flour may be characterized by a pH of 5.5-8.5, 6.0-8.0, or 6.5-7.5 for a 1% w/v solution of flour in water.

After culturing, the microalgae are inactivated (step 110). Inactivation conditions are chosen to be sufficient to inactivate enzymes that produce off-flavors. These conditions may also kill the microalgae or stop growth of the microalgae and contaminating species, if any. It has been found that rigorous pasteurization (i.e., at high temperature and/or long times) can lead to undesirable flavor/odor, while treatment that is not rigorous enough also can lead to unacceptable flavor/odor. Thus, when pasteurization is used, a delicate balance must be struck. Experiments have shown that a high-temperature-short time pasteurization ("HTST") treatment regime can be used to produce an acceptable microalgal biomass product. For example, the temperature of the treatment may be from 70° C. to 95° C., or 72° C. to 90° C., for from 10 to 180, 30 to 120, or 45 to 90 seconds. In one embodiment, microalgae are treated at 75° C. for 1 minute by flowing the cultured microalgal broth through a heat exchanger into a collection vessel. Cooling of the HTST output is preferred to avoid prolonged heating. Similar results should be obtainable by adjustment of both time and temperature. Delay prior to inactivation should be minimized so as to prevent the development of off-flavors, which are believed to be created by enzyme activity. Thus, in an embodiment of the present invention, the step of inactivating enzymes is performed without delay of a time sufficient to allow production in the microalgae of enzymatically developed off-flavors. Culture at an acidic pH may also allow for an even more gentle pasteurization to be used. For example, the microalgal cells can be cultured at a pH of from 5 to 6.5, followed by pasteurization at from about 60 to about 70° C. for 1 minute, and neutralization prior to drying.

To further improve flavor, the microalgal cells may be washed (step 115). Without wanting to be bound by theory, the washing may remove off-flavors. In addition, using an inactivation step prior to washing may permeabilize the cells or otherwise promote the removal of unwanted flavors or odors from the microalgal biomass. Washing may be performed by centrifugation, filtration, dialysis or other method known in the art. Optionally, the washing is performed with a volume of wash liquid (e.g., water or buffer) that is as great or greater than the volume of the microalgal cells (e.g., as measured by centrifugation). The volume of wash liquid may be twice the volume of the cells, or preferably, at least 3 times the volume of the cells. It was found that centrifugation in 6.4 times the cell volume gave a microalgal biomass with favorable flavor. Accordingly, in an embodiment of the present invention, the cells are washed with between 3 and 12 volumes of water. For these purposes, measurement of the cell volume is accomplished by dewatering the cells (i.e., removing them from the liquid growth medium). For example, the cells may be dewatered by centrifugation or filtration. Optionally, the washing step may be repeated one or more times.

Optionally, after washing, a preservative may be added (step 120). For example, sodium benzoate and/or potassium sorbate may be added as a bacteriostatic and fungistatic agent. Since sodium benzoate is more active under acidic conditions, the pH may be lowered as necessary. In that case, the pH can be raised later in the process to avoid an unwanted acidic flavor.

Optionally, the microalgal cells are then lysed (step 125). The lysis may be partial, or complete. For example, from 5% to 95% or a majority (>50%) of the cells may be lysed. Lysis may be especially desirable to release lipids in a high-lipid microalgae, where release of the lipids improves the quality or nutritional value of a food product into which the microalgal biomass is incorporated. Lysis may be accomplished with a bead mill, or any other suitable method known in the art. Optionally, a majority of the cells can be lysed. In one embodiment, about 30-75% of the microalgal cells are lysed. In another embodiment, about 30-75% of the microalgal cells are lysed and the microalgal cells have about 30-75% lipid by dry cell weight. In yet another embodiment, the microalgal cells are 60-90% lysed. This combination of parameters is believed to lead to a microalgal biomass that improves the mouthfeel, air-holding capacity or other functional parameters of a food into which it is integrated, while avoiding difficulties in drying or other processing steps that may be associated with highly lysed cells. In Example 3 below, the cells were lysed to about 80%.

Optionally, the biomass may be homogenized (step 130). For example, the suspension containing the cells and/or lysed cells may be forced through a narrow channel or orifice at elevated pressure (i.e., use of a high-pressure homogenizer). Other types of homogenizers such as blade or ultrasonic homogenizers may also be employed.

An antioxidant may be added to enhance the shelf life of the biomass (step 135). For example, tocopherols, BHA, BHT, rosemary extract, or other suitable food-grade antioxidants can be used. In addition to enhancement of shelf life, addition of antioxidant at the stage may prevent unwanted oxidation flavors from forming in the drying step. At this stage, addition of a base to raise the pH may prevent astringent flavors associated with a low pH if low pH conditions were used in upstream processes.

Prior to drying (e.g., after homogenization and before or after the optional addition of antioxidant), the microalgae can be held at elevated temperature for a period of time (140). Without wanting to be bound by theory, it is believed that this step promotes stability of the flavor, ensures inactivation of enzymes, and may promote the formation of positive flavors. For example, a suspension of lysed microalgae can be held at 70-85° for 1-6 minutes. In the Example 3 below for which acceptable sensory properties were obtained in the flour produced, this heating step was performed at 77° C. for 3 minutes. Comparable results may be obtained, for example, by heating at about 87° C. for about 90 seconds or about 67° C. for about 6 minutes.

The biomass is then dried (step 145). In one embodiment, in order to form a flour (a powder-like) substance, the biomass is spray dried. The spray drying may use, for example, a box-dryer, or a tall-form spray-dryer, a fluidized bed dryer, or a moving fluidized bed dryer (e.g., a FilterMat® spray dryer, GEA Process Engineering, Inc.). Example 3 describes conditions used for drying with a FilterMat drier.

The resulting flour may be measureable or flowable, even if high in lipid (e.g, 30-70 or 40-60% lipid by dry cell weight). In a specific embodiment, the flour has an aerated density of 0.30 to 0.50, a bulk density of 0.50 to 0.65, an oversize of 15-35% by weight at 2000 µm (i.e., % too large to pass through a 2000 µm sieve), 40-70% at 1400 µm and 1-20% at 800 µm, a wetability of 1-25 mm, and a surface area of 0.1 to 0.7 $m^2/g$.

To test wetability:
introduce 500 ml of deionized water at 20° C. into a 600 ml squat-form beaker (Fisherbrand FB 33114),
place 25 g of the microalgal flour powder uniformly at the surface of the water, without mixing,
observe the behavior of the powder after 3 h of contact,
measure the height of the product that has penetrated the surface of the water and settled at the bottom of the beaker.

The aerated bulk density is determined using a conventional method of measuring aerated bulk density, i.e. by measuring the mass of an empty container (g) of known volume, and by measuring the mass of the same container filled with the product to be tested.

The difference between the mass of the filled container and the mass of the empty container, divided by the volume (ml) then gives the value of the aerated bulk density.

For this test, the 100 ml container, the scoop used for filing and the scraper used are supplied with the apparatus sold by the company Hosokawa under the trademark Powder Tester type PTE.

To perform the measurement, the product is screened through a sieve with apertures of 2000 µm (sold by SAULAS). The density is measured on the product that is not retained on that screen.

The specific surface area is determined over the whole of the particle size distribution of the microalgal flour granules, e.g., by means of a Quantachrome specific surface area analyzer based on a test for absorption of nitrogen onto the surface of the product subjected to the analysis, carried out on a SA3100 apparatus from Beckmann Coulter, according to the technique described in the article BET Surface Area by Nitrogen Absorption by S. BRUNAUER et al. (Journal of American Chemical Society, 60, 309, 1938).

The microalgal flour is tested for acceptable flavor, color odor, and/or mouthfeel (step 150). For example, a human sensory panel may be employed and/or analytical technology such as headspace GC-MS, SPME, or SBSE. Optionally, the flavor may be evaluated to determine if it is grouped with or falls within boundaries associated with acceptable flavor determined by a prior sensory panel and/or analytical testing. The groupings/boundaries may be determined with the use of principal component analysis (PCA) (see Examples below). An acceptable lot may then be selected for packaging and future use.

After drying and optional testing, the biomass may undergo any further processing or packaging (step 155) needed to make a microalgal flour or a food product that incorporates the biomass. For example, to make microalgal flour, the biomass may be agitated or passed through a screen. The microalgal flour may also be mixed with other ingredients to make a soup, sauce, dough, cake, cookie, dry baked-good mix, etc. Testing can also be performed according to Examples 4, 5 and 8, below.

In accordance with embodiments of the invention, any two or more of the above-mentioned techniques can be combined to reach a heretofore unprecedented flavor in a microalgal biomass product, such as microalgal flour. For example, HTST treatment followed by washing with liquid as described above can produce microalgal flour having low off-flavor. Oxygenation during cultivation and other steps as described above may further improve the flavor.

By selecting an appropriate microalgal strain and using the methods disclosed herein, a microalgal biomass or flour made from the biomass having acceptable sensory characteristics may result. The microalgal flour may be non-green and have undetectable levels of fish, mushroom or cabbage flavors or odors when diluted in water at a ratio (by volume) of 1:2, 1:5, 1:10, 1:20, 1:30, or 1:40. In an embodiment, off flavors of fish and cabbage are undetectable when diluted 1:20 by volume in water, as detected by a tasting panel.

The following flavor/odor compounds were determined by the methods of Examples 4 or 5 and are believed to correlate with acceptable sensory testing: undecalactone (400-1800 ppb), 3-methyl butanal (0-11,000 ppb), pentanal (160-10,700 ppb), 2-methyl butanal (0-2500 ppb), 2-pentanone (39-10,600 ppb), 3-pentene-2-one (0-1500 ppb).

Acceptable samples also had less than threshold amounts of pyrrole, pyrazine, or pyridines-containing compounds, while these compounds were found in the sample of *Chlorella vulgaris* obtained from www.nuts.com, which was green and unacceptable in flavor and odor.

In an embodiment, the microalgal flour produced by the methods described above retain the low amounts of off-flavors mentioned for at least 2 weeks, 1 month, 3 months or 6 months when stored in the dark at room temperature in moisture and oxygen impermeable packaging (e.g. a Mylar® food storage bag).

Optionally, larger particles, granules or pellets can be made from the dried microalgal material. For example, the flour can be agglomerated, granulated, extruded, or pelletized using a variety of methods known in the art.

Example 1. Production of Microalgal Flour at Low pH and Using a Low-Pigment Strain Multiple fermentations of *Chlorella protothecoides* were performed at scales ranging from 7 L to 1000 L. Two strains of *Chlorella protothecoides* were used: strain A, and strain B, a low-pigment mutant. Fermentation was performed in the dark on glucose as a fixed carbon source at a pH of about 5 to 6. After fermentation, the fermentation broth containing the microalgae was heat treated to inactivate the microalgae, immediately diluted with excess water, centrifuged to wash and concentrate the microalgae, the cells were lysed by milling, then spray-dried to make a microalgal flour. The microalgal flour made from Strain A was light yellow in color and the microalgal flour made from strain B was tan in color. A fermentation of strain B was also performed at about neutral pH.

Example 2. Low-Color Flour Using High Oxygen Conditions

Strain B was cultivated in at high (about 60%-70%) and low levels (about 30-40%) of dissolved oxygen and treated as in Example 1 to form microalgal flour. For the high oxygen experiment, reduced yellow color was noted in the broth, centrifuged biomass and in the final flour as compared to the microalgae produced at lower oxygen.

Example 3. Production of Improved Microalgal Flour

A seed culture of *Chlorella protothecoides* was added to a defined medium broth to give 9,000 L of culture. Heat-sterilized glucose (55% w/w) was used as a carbon source. Dissolved oxygen was held to a minimum of 30% by controlling aeration, backpressure and agitation in the fermentor. The cultivation temperature was 28° C. The pH of the broth was 6.8 at the start of cultivation and dropped to about 6 over the course of cultivation. Glucose was fed to a concentration of 3-10 g/L concentration. Growth was continued over 4-5 days to the mid-log-phase as measured by OD750. The resulting product had a dry cell weight (DCW) of 18.5% w/v. The nitrogen level in the growth medium was limiting to force the microalgae to accumulate approximately 50% lipid as a result of extended sugar feeding.

The broth was then heat-treated by online HTST at 75° C. for 1 min and cooled to 6.2° C., then stored at 7° C. The HTST-treated broth was then washed by 6.4-fold dilution in decarbonated water and centrifuged using an Alfa Laval FEUX 510 centrifuge.

The pH was lowered to pH to 4.1 with 75% phosphoric acid and 500 ppm sodium benzoate/1000 ppm potassium sorbate (on dry basis) were added as a preservative.

The material was then stored under agitation below 10° C. Lysis was accomplished by milling in a NETZSCH LME500 bead mill using 0.5 mm zirconium silicate beads to give 88% cell disruption. The outlet was cooled to 6° C.

Ascorbic acid (150 ppm on a dry basis) and mixed tocopherols (500 ppm on a dry basis) were added to the material to prevent oxidation. Potassium hydroxide was added to neutralize the pH.

The material was then heated to 77° C. for 3 minutes.

Drying was accomplished on a Filtermat FMD125 drier with a cyclone. The nozzle pressure was 160-170 bar.

Example 4. SPME (SolidPhase MicroExtraction)

Samples (500 mg) plus 3 mL distilled water plus 1 gm NaCl plus 5 uL 0.022 ug/uL 2-undecanone in ethanol internal standard were incubated at 50° C. for 10 min and then extracted by SPME at 50° C. for 20 min while stirring with the orbital shaker of the Gerstel MPS2. The SPME fiber used was DVB/CAR/PDMS (Divinylbenzene/Carboxen/Polydimethylsiloxane), df 50/30 μm. The fiber was desorbed at 260° C. in the Agilent split/splitless injector for 3 min. Volatiles were desorbed into a Leco Pegasus GC-TOFMS and separated on a DB5-MS column (30 m, 0.25 mm, 0.25 um) with helium carrier gas flow at 1.0 mL/min. The initial column temperature was 40° C. (for 3 min) and then increased to 270° C. at 15° C./min and held at 270° C. for 5 min. Mass detection was performed in the electron impact mode (EI). All injections were splitless. Peak identification is based on comparison of EI mass spectra in samples to EI mass spectra of the NIST Library. Data is reported as relative concentration compared to the internal standard expressed in ppb

Example 5. SBSE (StirBar Sorptive Extraction)

Samples (500 mg) plus 10 mL distilled water plus 5 uL 0.022 ug/uL 2-undecanone internal standard in ethanol were extracted for 1 hr while stirring at 1000 rpm using a 2 cm Gerstel PDMS Twister. One gram of NaCl was then added to the sample and extraction was continued for another hour. The technique is known as sequential SBSE. The Twister is then removed from the sample, rinsed with distilled water, patted dry with a lintless cloth and thermally desorbed in a Gerstel TDU used in the splitless mode. With the TDU, desorbed volatiles were initially trapped at −100° C.; the volatiles trapped on the Twister were then desorbed at 280° C. for 3 min. Volatiles were desorbed into an Agilent GC-MSD and separated on a DB5-MS column (30 m, 0.25 mm, 0.25 um) with helium carrier gas flow at 1.0 mL/min. The initial column temperature was 40° C. (for 3 min) and then increased to 270° C. at 10° C./min and held at 270° C.

for 5 min. Mass detection was performed in the electron impact mode (EI). All injections were splitless. Peak identification is based on comparison of EI mass spectra in samples to EI mass spectra of the NIST Library. Data is reported as relative concentration compared to the internal standard expressed in ppb.

Example 6. Flavor/Odor Data for Acceptable Sample of Example 3

The sample produced in Example 3 was tested by sensory panel and analyzed by SPME and SBSE as in Examples 4 and 5. The results are reported in the table below in units of parts per billion, determined relative to the 2-undecanone internal standard. In the tables below, a is used to represent alpha, d for delta, g for gamma. CAS numbers for the compounds are listed in Example 7.

| Chemical | Mean relative concentration |
| --- | --- |
| Dimethyl.sulfide | 0 |
| 2.3.Butanedione | 248 |
| Butanal | 9.5 |
| Propanal..2.methyl. | 75 |
| Furan..3.methyl. | 67.5 |
| Ethyl.Acetate | 1671.5 |
| 2.Butenal...E.. | 47.5 |
| Butanal..3.methyl. | 0 |
| 1.Butanol | 26 |
| Butanal..2.methyl. | 0 |
| Thiophene | 0 |
| 1.Penten.3.ol | 0 |
| 1.Penten.3.one | 7 |
| 2.Pentanone | 38.5 |
| 2.3.Pentanedione | 688.5 |
| Pentanal | 2876 |
| Furan..2.ethyl. | 2 |
| Thiazole | 0 |
| 3.Penten.2.one | 7.5 |
| Disulfide..dimethyl | 42 |
| 2.Pentenal...E.. | 89.5 |
| Pyrrole | 0 |
| Oxazole..4.5.dimethyl. | 0 |
| 2.Penten.1.ol...Z.. | 0 |
| Thiophene..3.methyl. | 68.5 |
| Hexanal | 16198 |
| 4.Methylthiazole | 0 |
| Pyrazine..methyl. | 0 |
| Furfural | 0 |
| Oxazole..trimethyl. | 0 |
| Butanoic.acid..3.methyl. | 0 |
| Butanoic.acid..2.methyl. | 0 |
| 2.Hexenal | 0 |
| 1.Hexanol | 0 |
| 4.Heptanone | 415 |
| Pyridine..2.6.dimethyl. | 0 |
| Thiazole..2.4.dimethyl. | 0 |
| 3.Heptanone | 174 |
| 2.Heptanone | 104 |
| 3.Heptanol | 2426.5 |
| Heptanal | 700.5 |
| Methional | 0 |
| Pyrazine..2.5.dimethyl. | 0 |
| Pyrazine..2.6.dimethyl. | 0 |
| Pyrazine..ethyl. | 0 |
| Pyrazine..2.3.dimethyl. | 0 |
| Pyrazine..ethenyl. | 0 |
| Thiazole..4.5.dimethyl. | 0 |
| 2.Heptanone..6.methyl. | 0 |
| Hexanal..2.ethyl. | 75 |
| 2.Heptenal...Z.. | 493 |
| 5.Nonen.2.one | 0 |
| 2.Furancarboxaldehyde..5.methyl...cooked.milk. | 0 |
| Benzaldehyde | 231 |
| hexanoic.acid | 38.5 |
| 1.Octen.3.ol | 173 |
| Dimethyl.trisulfide | 0 |
| 2.5.Octanedione | 87.5 |
| 5.Hepten.2.one..6.methyl. | 107.5 |
| Furan..2.pentyl. | 1.5 |
| 2.4.Heptadienal...E.E.. | 0 |
| Pyrazine..2.ethyl.6.methyl. | 0 |
| Octanal | 1067 |
| Pyrazine..trimethyl. | 0 |
| Pyrazine..2.ethyl.3.methyl. | 0 |
| 2.4.Heptadienal...E.E...1 | 13.5 |
| Pyrazine..2.ethenyl.6.methyl. | 0 |
| 1.Hexanol..2.ethyl. | 11445.5 |
| 3.Octen.2.one...E.. | 0 |
| 2H.Pyran.2.one..5.6.dihydro. | 1472 |
| Benzeneacetaldehyde | 0 |
| 3.5.Octadien.2.one...E.E.. | 0 |
| Acetophenone | 74 |
| 1.Decen.3.one | 0 |
| Pyrazine..3.ethyl.2.5.dimethyl. | 0 |
| Pyrazine..tetramethyl. | 0 |
| 5.Methyl.2.thiophenecarboxaldehyde | 0 |
| g.Heptalactone | 0 |
| Linalool | 0 |
| Nonanal | 1436.5 |
| Thymol | 0 |
| Phenylethyl.Alcohol | 0 |
| 2.3.5.Trimethyl.6.ethylpyrazine. | 0 |
| Acetic.acid..phenylmethyl.ester | 179.5 |
| Safranal | 0 |
| 2.Decenal...E.. | 150 |
| g.octalacone | 0 |
| o.Amino.acetophenone | 0 |
| 2.4.Decadienal | 0 |
| g.Nonlactone | 0 |
| Ionone | 0 |
| Geranyl.acetone | 0 |
| Ionene | 0 |
| g.Nonlactone.1 | 0 |
| 2.4.Nonadienal...E.E.. | 0 |
| 2.4.Decadienal.1 | 17.980041 |
| g.Heptalactone.1 | 0 |
| Ionone.1 | 0 |
| Geranyl.acetone.1 | 0 |
| a.Ionone | 0 |
| Peach.lactone.g.undecalactone | 46.4516735 |
| d.Decalactone | 186.835836 |
| cis.Geranylacetone | 0 |
| d.dodecalactone..δ.Nonyl.δ.valeralactone. | 1582.590707 |
| d.Undecalactone | 11295.4731 |

Example 7. PCA Analysis

Multiple production lots of *Chlorella protothecoides* microalgal flour were produced according to methods given above. In addition, a commercial sample of *Chlorella* powder was obtained from nuts.com; the product information as of the date of filing. http://www.nuts.com/ assigns the flour to a Korean source, with heterotrophic production. A total of 12 samples, measured in duplicate by SBSE and SPME as in Examples 4 and 5, were used. In addition, sensory testing was done using a panel of volunteers. Scaled principal component analysis (using a correlation matrix) was performed with R software version 2.15.1 (The R project for Statistical Computing, www.r-project.org) using the prcomp function. Three principal components were found that well characterize the variation in flavor/odor compounds. Vectors defining the three principal components are listed in the table below as PC1, PC2, and PC3 along with the method used for determining each compound. A cluster of samples was found in this reduced-dimensional space that correlated with the samples having acceptable sensory characteristics.

| Chemical Name | CAS | PC1 | PC2 | PC3 | GC Method |
|---|---|---|---|---|---|
| Dimethyl sulfide | 75-18-3 | 0.0076 | −0.154649 | 0.1379564 | SPME |
| 2,3-Butanedione | 431-03-8 | −0.05341 | 0.116238 | 0.1384577 | SPME |
| Butanal | 123-72-8 | −0.0612 | 0.021748 | −0.1541993 | SPME |
| Propanal, 2-methyl- | 78-84-2 | −0.0248 | −0.203551 | 0.1420793 | SPME |
| Furan, 3-methyl- | 930-27-8 | −0.13905 | 0.053489 | −0.0400092 | SPME |
| Ethyl Acetate | 141-78-6 | 0.02303 | 0.078633 | 0.1490604 | SPME |
| 2-Butenal, (E)- | 123-73-9 | 0.0346 | −0.007869 | −0.2288552 | SPME |
| Butanal, 3-methyl- | 590-86-3 | −0.01585 | −0.209996 | 0.152554 | SPME |
| 1-Butanol | 71-36-3 | 0.01482 | 0.147081 | 0.1203239 | SPME |
| Butanal, 2-methyl- | 96-17-3 | −0.06977 | −0.186611 | 0.1433748 | SPME |
| Thiophene | 110-02-1 | −0.14535 | 0.003674 | −0.0107213 | SPME |
| 1-Penten-3-ol | 616-25-1 | −0.10591 | 0.05907 | −0.0208901 | SPME |
| 1-Penten-3-one | 1629-58-9 | 0.02932 | −0.055926 | −0.1865801 | SPME |
| 2-Pentanone | 107-87-9 | 0.01895 | −0.168215 | 0.1843823 | SPME |
| 2,3-Pentanedione | 600-14-6 | 0.03772 | −0.074626 | −0.0103901 | SPME |
| Pentanal | 110-62-3 | −0.05954 | −0.059048 | −0.1301291 | SPME |
| Furan, 2-ethyl- | 3208-16-0 | −0.00841 | −0.0761 | −0.0141672 | SPME |
| Thiazole | 288-47-1 | −0.14288 | −0.031332 | 0.0205445 | SPME |
| 3-Penten-2-one | 625-33-2 | 0.03658 | −0.118624 | 0.1932202 | SPME |
| Disulfide, dimethyl | 624-92-0 | 0.00766 | 0.07675 | −0.030508 | SPME |
| 2-Pentenal, (E)- | 1576-87-0 | 0.02904 | 0.005659 | −0.0633539 | SPME |
| Pyrrole | 109-97-7 | −0.14542 | 0.001009 | −0.0083546 | SPME |
| Oxazole, 4,5-dimethyl- | 20662-83-3 | −0.14535 | 0.003674 | −0.0107213 | SPME |
| 2-Penten-1-ol, (Z)- | 1576-95-0 | −0.14181 | −0.022408 | −0.0072056 | SPME |
| Thiophene, 3-methyl- | 616-44-4 | 0.00669 | 0.144512 | 0.1163417 | SPME |
| Hexanal | 66-25-1 | 0.02329 | 0.064197 | −0.1621187 | SPME |
| 4-Methylthiazole | 693-95-8 | −0.14535 | 0.003674 | −0.0107213 | SPME |
| Pyrazine, methyl- | 109-08-0 | −0.13884 | −0.055436 | 0.0337262 | SPME |
| Furfural | 98-01-1 | −0.14535 | 0.003674 | −0.0107213 | SPME |
| Oxazole, trimethyl- | 20662-84-4 | −0.14535 | 0.003674 | −0.0107213 | SPME |
| Butanoic acid, 3-methyl- | 503-74-2 | −0.14535 | 0.003674 | −0.0107213 | SPME |
| Butanoic acid, 2-methyl- | 116-53-0 | −0.14535 | 0.003674 | −0.0107213 | SPME |
| 2-Hexenal | 505-57-7 | 0.02747 | −0.052249 | −0.2361552 | SPME |
| 1-Hexanol | 111-27-3 | 0.03121 | 0.198559 | 0.0119837 | SPME |
| 4-Heptanone | 123-19-3 | −0.00358 | −0.135096 | 0.0100197 | SPME |
| Pyridine, 2,6-dimethyl- | 108-48-5 | −0.14535 | 0.003674 | −0.0107213 | SPME |
| Thiazole, 2,4-dimethyl- | 541-58-2 | −0.14535 | 0.003674 | −0.0107213 | SPME |
| 3-Heptanone | 106-35-4 | 0.02161 | −0.184446 | −0.1716557 | SPME |
| 2-Heptanone | 110-43-0 | −0.09702 | −0.058868 | 0.0154171 | SPME |
| 3-Heptanol | 589-82-2 | 0.02303 | −0.205456 | −0.1113283 | SPME |
| Heptanal | 111-71-7 | −0.11331 | 0.141566 | −0.0259176 | SPME |
| Methional | 3268-49-3 | −0.11001 | −0.130401 | 0.0939776 | SPME |
| Pyrazine, 2,5-dimethyl- | 123-32-0 | 0.02063 | −0.11695 | −0.0042558 | SPME |
| Pyrazine, 2,6-dimethyl- | 108-50-9 | −0.14539 | −0.007146 | −0.0010984 | SPME |
| Pyrazine, ethyl- | 13925-00-3 | −0.14544 | −4.79E−05 | −0.0074156 | SPME |
| Pyrazine, 2,3-dimethyl- | 5910-89-4 | −0.14541 | 0.001518 | −0.0088075 | SPME |
| Pyrazine, ethenyl- | 4177-16-6 | −0.14535 | 0.003674 | −0.0107213 | SPME |
| Thiazole, 4,5-dimethyl- | 3581-91-7 | −0.14535 | 0.003674 | −0.0107213 | SPME |
| 2-Heptanone, 6-methyl- | 928-68-7 | −0.14535 | 0.003674 | −0.0107213 | SPME |
| Hexanal, 2-ethyl- | 123-05-7 | 0.01846 | −0.027007 | −0.1799374 | SPME |
| 2-Heptenal, (Z)- | 57266-86-1 | 0.02161 | −0.093801 | −0.1905916 | SPME |
| 5-Nonen-2-one | 27039-84-5 | −0.14535 | 0.003674 | −0.0107213 | SPME |
| 2-Furancarboxaldehyde, 5-methyl- | 620-02-0 | 0.01921 | −0.109621 | 0.1754483 | SPME |
| Benzaldehyde | 100-52-7 | −0.14243 | 0.046336 | 0.0247769 | SPME |
| hexanoic acid | 109-52-4 | −0.00113 | 0.064879 | −0.0160903 | SPME |
| 1-Octen-3-ol | 3391-86-4 | −0.09067 | −0.045064 | −0.1354748 | SPME |
| Dimethyl trisulfide | 3658-80-8 | 0.0289 | −0.064852 | −0.1508671 | SPME |
| 2,5-Octanedione | 3214-41-3 | 0.02899 | −0.075905 | −0.0937522 | SPME |
| 5-Hepten-2-one, 6-methyl- | 110-93-0 | −0.14527 | 0.00547 | −0.0141759 | SPME |
| Furan, 2-pentyl- | 3777-69-3 | −0.07838 | 0.16758 | −0.0356101 | SPME |
| 2,4-Heptadienal, (E,E)- | 4313-03-5 | 0.024 | −0.071588 | −0.1450388 | SPME |
| Pyrazine, 2-ethyl-6-methyl- | 13925-03-6 | −0.14535 | 0.003674 | −0.0107213 | SPME |
| Octanal | 124-13-0 | 0.06342 | 0.197764 | −0.0144755 | SPME |
| Pyrazine, trimethyl- | 14667-55-1 | −0.14463 | −0.018889 | 0.0093576 | SPME |
| Pyrazine, 2-ethyl-3-methyl- | 15707-23-0 | −0.14535 | 0.003674 | −0.0107213 | SPME |
| 2,4-Heptadienal, (E,E)- | 4313-03-5 | 0.03375 | −0.100784 | −0.1998281 | SPME |
| Pyrazine, 2-ethenyl-6-methyl- | 13925-09-2 | −0.14535 | 0.003674 | −0.0107213 | SPME |
| 1-Hexanol, 2-ethyl- | 104-76-7 | 0.01545 | −0.147033 | −0.1738968 | SPME |
| 3-Octen-2-one, (E)- | 18402-82-9 | 0.02243 | −0.027669 | −0.1418 | SPME |
| 2H-Pyran-2-one, 5,6-dihydro- | 3393-45-1 | 0.04024 | 0.008083 | −0.0019753 | SPME |
| Benzeneacetaldehyde | 122-78-1 | 0.01141 | −0.200551 | 0.1476711 | SPME |
| 3,5-Octadien-2-one, (E,E)- | 30086-02-3 | 0.02431 | 0.191552 | −0.0405352 | SPME |
| Acetophenone | 98-86-2 | 0.03482 | 0.112029 | 0.0678319 | SPME |
| 1-Decen-3-one | 56606-79-2 | 0.01487 | −0.007144 | 0.0679731 | SPME |
| Pyrazine, 3-ethyl-2,5-dimethyl- | 13360-65-1 | −0.14539 | 0.002524 | −0.0097007 | SPME |
| Pyrazine, tetramethyl- | 1124-11-4 | −0.14544 | −0.003912 | −0.0054264 | SPME |
| 5-Methyl-2-thiophenecarboxaldehyde | 13679-70-4 | −0.14535 | 0.003674 | −0.0107213 | SPME |

-continued

| Chemical Name | CAS | PC1 | PC2 | PC3 | GC Method |
|---|---|---|---|---|---|
| g-Heptalactone | 105-21-5 | 0.01298 | 0.140814 | 0.1183756 | SPME |
| Linalool | 78-70-6 | −0.14535 | 0.003674 | −0.0107213 | SPME |
| Nonanal | 124-19-6 | 0.05356 | 0.198786 | −0.1092893 | SPME |
| Thymol | 89-83-8 | −0.14535 | 0.003674 | −0.0107213 | SPME |
| Phenylethyl Alcohol | 60-12-8 | −0.14506 | −0.014282 | 0.003239 | SPME |
| 2,3,5-Trimethyl-6-ethylpyrazine | 17398-16-2 | −0.14538 | 0.002837 | −0.0099785 | SPME |
| Acetic acid, phenylmethyl ester | 140-11-4 | 0.04544 | 0.114759 | 0.1539536 | SPME |
| Safranal | 116-26-7 | −0.14535 | 0.003674 | −0.0107213 | SPME |
| 2-Decenal, (E)- | 3913-81-3 | 0.03435 | −0.01297 | −0.2149363 | SPME |
| g-Octalactone | 104-50-7 | 0.01639 | 0.142953 | 0.0964521 | SPME |
| o-Amino acetophenone | 551-93-9 | 0.02232 | 0.204042 | 0.0183701 | SPME |
| 2,4-Decadienal | 2363-88-4 | 0.01791 | 0.169004 | −0.0389474 | SBSE |
| g-Nonlactone | 104-61-0 | 0.01493 | 0.18923 | 0.0333768 | SPME |
| a-Ionone | 127-41-3 | −0.14535 | 0.003674 | −0.0107213 | SPME |
| Geranyl acetone | 3796-70-1 | −0.14542 | −0.002004 | −0.0085515 | SPME |
| a-Ionene | 14901-07-6 | −0.14535 | 0.003674 | −0.0107213 | SBSE |
| g-Nonalactone | 104-61-0 | 0.01637 | −0.075372 | −0.0496326 | SBSE |
| 2,4-Nonadienal | 6750-03-4 | 0.03136 | −0.023742 | −0.1745061 | SBSE |
| 2,4-Decadienal | 2363-88-4 | 0.02952 | 0.094377 | −0.1710607 | SBSE |
| g-Heptalactone | 105-21-5 | 0.01775 | 0.158721 | −0.0198467 | SBSE |
| a-Ionone | 127-41-3 | −0.14535 | 0.003674 | −0.0107213 | SBSE |
| Geranyl acetone | 3796-70-1 | −0.14535 | 0.003674 | −0.0107213 | SBSE |
| a-Ionone | 127-41-3 | −0.14535 | 0.003674 | −0.0107213 | SBSE |
| g-Undecalactone | 104-67-6 | 0.09703 | −0.071462 | 0.0844344 | SBSE |
| d-Decalactone | 705-86-2 | 0.03467 | −0.188054 | 0.0770618 | SBSE |
| cis-Geranylacetone | 3879-26-3 | 0.01193 | 0.016184 | −0.0633938 | SBSE |
| d-Dodecalactone.. | 713-95-1 | 0.13073 | −0.059213 | 0.0333184 | SBSE |
| d-Undecalactone | 710-04-3 | 0.05183 | −0.042457 | −0.1311766 | SBSE |

Figure 2:
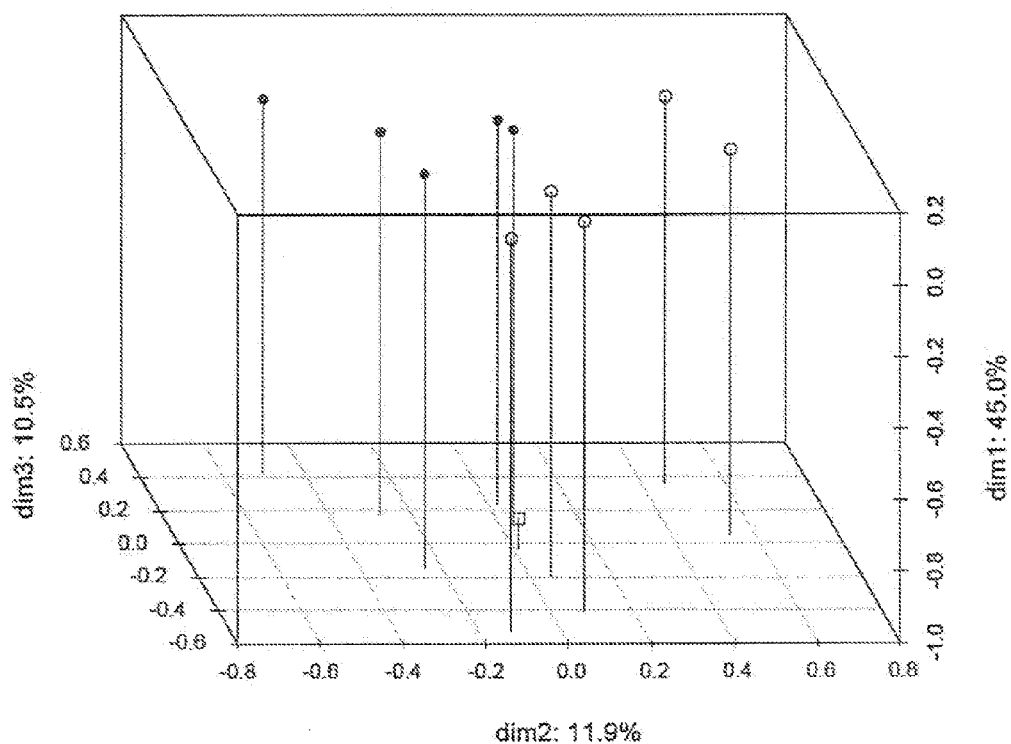
FIG. 2 is a graph showing the PCA analysis clustering discussed in Example 7.

The graph provided in FIG. 2 shows the PCA analysis clustering. Each plotted point represents a microalgal powder sample plotted in a space defined by the principal components PC1, PC2, and PC3 (dim1, dim2 and dim3 respectively). The solid circles represent *Chlorella protothecoides* flour samples that has acceptable flavor. The open circles represent *Chlorella protothecoides* flour samples with inferior flavor. The open square represent the *Chlorella vulgaris* obtained from Nuts.com.

Example 8. Determination of Bounds for Acceptable Flavor

Based on the PCA analysis of Example 7, the FactomineR package v. 1.2.1 (Husson, et al.) was used to statistically define the cluster of samples that correlated with the acceptable sensory testing. The result of the FactomineR analysis was 3 ellipsoids in the three dimensions of PC1, PC2 and PC3; the ellipsoids characterize 1, 2, and 3 standard deviations from center point of the cluster associated with the positive human sensory analysis (solid circles from the graph shown in FIG. 2). Each 3-dimensional ellipsoid is defined by 3 orthogonal 2-dimensional ellipses defined by the equation $Ax^2+Bxy+Cy^2+Dx+Ey+F=0$ using the data in the table below for the values of A, B, C, D, E, and F. Thus, samples falling within the smallest ellipsoid will be expected to have a positive sensory analysis by a human panel about 99.7% of the time, samples falling within only the mid-sized ellipsoid will be expected to have a positive sensory analysis by a human panel about 95% of the time, and samples falling only within the largest ellipsoid will be expected to have a positive sensory analysis by a human panel about 68% of the time.

Equation for Confidence Intervals:

$$Ax^2+Bxy+Cy^2+Dx+Ey+F=0 \qquad \text{Equation}$$

| Standard Deviations | X Dimension | Y Dimension | A | B | C | D | E | F |
|---|---|---|---|---|---|---|---|---|
| 3 | PC1 | PC2 | 0.003481467 | −0.000366174 | 3.79437E−05 | −0.000628924 | 4.27301E−05 | 1.51548E−05 |
| 3 | PC1 | PC3 | 0.001734328 | 0.000286969 | 1.89401E−05 | −0.000318201 | −2.8099E−05 | 1.12003E−05 |
| 3 | PC2 | PC3 | 0.356218856 | 0.289219807 | 0.356936631 | 0.085191149 | −0.040237159 | −0.13812915 |
| 2 | PC1 | PC2 | 0.000477458 | −5.02181E−05 | 5.2037E−06 | −8.62524E−05 | 5.86012E−06 | 3.01302E−06 |
| 2 | PC1 | PC3 | 0.00023785 | 3.93556E−05 | 2.5975E−06 | −4.3639E−05 | −3.85357E−06 | 1.76892E−06 |
| 2 | PC2 | PC3 | 0.048852827 | 0.039664394 | 0.048951264 | 0.011683347 | −0.005518234 | −0.009118978 |
| 1 | PC 1 | PC 2 | 2.78319E−05 | −2.9273E−06 | 3.03333E−07 | −5.0278E−06 | 3.41597E−07 | 2.11154E−07 |
| 1 | PC 1 | PC 3 | 1.38647E−05 | 2.29411E−06 | 1.51413E−07 | −2.54379E−06 | −2.24631E−07 | 1.11963E−07 |
| 1 | PC 2 | PC 3 | −0.000665829 | 0.000466136 | −0.000152694 | 0.000380618 | −0.000136456 | −4.14371E−05 |

Example 9. QC Analysis Using Results of PCA Analysis

The ellipsoids of Example 8 can be used to determine if a sample falls within the cluster associated with positive flavor. For example, a quality-control experiment can be performed on a batch of microalgal flour produced according to the methods given above. The flour is analyzed by SPME and SBSE as in Examples 4 and 5 and then one determines if the data falls within one or more of the ellipsoids of Example 8.

To do this, one can use the following procedure (though others may be applicable): Start with relative concentration for 105 compounds. From each concentration subtract it's center factor and divide by its scale factor (given in the table below), this centers and scales the data. Take the dot product of the scaled and centered data and the principal component (PC) loadings, this will yield one value for each PC. Divide each value by its associated plotting factor, this will allow the data point to be plotted in three dimensional algal-chemical space. If the point falls within the space bounded by the confidence ellipsoid it is not statistically different ($p<0.05$). For example, if the point falls within the space bounded by the 95% confidence ellipsoid it is not statistically different ($p<0.05$).

| Chemical | Center | Scale | PC1 | PC2 | PC3 |
| --- | --- | --- | --- | --- | --- |
| Dimethyl.sulfide | 15.04166667 | 52.10586179 | 0.007602386 | −0.154648539 | 0.13795639 |
| 2.3.Butanedione | 573.4583333 | 687.3035077 | −0.053406645 | 0.116238372 | 0.138457708 |
| Butanal | 165.0833333 | 291.8766733 | −0.061200873 | 0.021748265 | −0.154199309 |
| Propanal..2.methyl. | 294.25 | 321.9922006 | −0.02479716 | −0.203551061 | 0.142079295 |
| Furan..3.methyl. | 254.0833333 | 364.0905752 | −0.139050167 | 0.053488926 | −0.040009249 |
| Ethyl.Acetate | 1534.958333 | 721.2414001 | 0.023033335 | 0.078632968 | 0.149060426 |
| 2.Butenal...E.. | 56.95833333 | 67.74264748 | 0.034598984 | −0.007869304 | −0.228855217 |
| Butanal..3.methyl. | 2368.958333 | 3305.894731 | −0.015854973 | −0.209996041 | 0.152553963 |
| 1.Butanol | 236.75 | 723.0508438 | 0.01482126 | 0.147080874 | 0.120323863 |
| Butanal..2.methyl. | 858.0416667 | 1132.843254 | −0.069765232 | −0.186660612 | 0.143374765 |
| Thiophene | 0.708333333 | 2.453738644 | −0.145349572 | 0.003673658 | −0.010721336 |
| 1.Penten.3.ol | 111.2916667 | 123.2715883 | −0.105910877 | 0.059069801 | −0.020890092 |
| 1.Penten.3.one | 10.625 | 18.86570361 | 0.029319785 | −0.055925743 | −0.186580083 |
| 2.Pentanone | 429.875 | 520.4705967 | 0.018948769 | −0.168215403 | 0.184382338 |
| 2.3.Pentanedione | 392.625 | 359.8726495 | 0.037715762 | −0.074625863 | −0.010390137 |
| Pentanal | 5315.166667 | 4258.727501 | −0.05954475 | −0.05904769 | −0.130129097 |
| Furan..2.ethyl. | 32.75 | 24.43590875 | −0.008414663 | −0.076099651 | −0.014167153 |
| Thiazole | 70.16666667 | 199.0549642 | −0.142882049 | −0.031332244 | 0.020544457 |
| 3.Penten.2.one | 442.125 | 470.5612763 | 0.036579138 | −0.118623927 | 0.193220234 |
| Disulfide..dimethyl | 77.45833333 | 105.2821875 | 0.007660621 | 0.076749927 | −0.030508003 |
| 2.Pentenal...E.. | 116.7083333 | 200.60312 | 0.029036734 | 0.005658787 | −0.063353931 |
| Pyrrole | 12.29166667 | 41.79846579 | −0.145424967 | 0.001008736 | −0.008354639 |
| Oxazole..4.5.dimethyl. | 15.83333333 | 54.84827557 | −0.145349572 | 0.003673658 | −0.010721336 |
| 2.Penten.1.ol...Z.. | 45.25 | 118.0232065 | −0.141807908 | −0.022407562 | −0.007205637 |
| Thiophene..3.methyl. | 108.5416667 | 279.7959856 | 0.006693629 | 0.144512146 | 0.116341706 |
| Hexanal | 26189.95833 | 17886.61913 | 0.023290612 | 0.064196972 | −0.162118696 |
| 4.Methylthiazole | 1.958333333 | 6.783865663 | −0.145349572 | 0.003673658 | −0.010721336 |
| Pyrazine..methyl. | 135.2083333 | 326.6405766 | −0.138842567 | −0.055435505 | 0.03372617 |
| Furfural | 34.5 | 119.5115057 | −0.145349572 | 0.003673658 | −0.010721336 |
| Oxazole..trimethyl. | 64 | 221.7025034 | −0.145349572 | 0.003673658 | −0.010721336 |
| Butanoic.acid..3.methyl. | 58.58333333 | 202.9386196 | −0.145349572 | 0.003673658 | −0.010721336 |
| Butanoic.acid..2.methyl. | 3.833333333 | 13.27905619 | −0.145349572 | 0.003673658 | −0.010721336 |
| 2.Hexenal | 25.58333333 | 50.09710268 | 0.027469429 | −0.052249399 | −0.23615517 |
| 1.Hexanol | 106.5416667 | 155.9474465 | 0.031207096 | 0.198558566 | 0.011983686 |
| 4.Heptanone | 360.5833333 | 577.8576749 | −0.003575779 | −0.135096305 | 0.010019679 |
| Pyridine..2.6.dimethyl. | 2.958333333 | 10.24796728 | −0.145349572 | 0.003673658 | −0.010721336 |
| Thiazole..2.4.dimethyl. | 15.58333333 | 53.98225017 | −0.145349572 | 0.003673658 | −0.010721336 |
| 3.Heptanone | 111.625 | 94.41016052 | 0.021607662 | −0.18444557 | −0.171655667 |
| 2.Heptanone | 380.875 | 288.460973 | −0.097016748 | −0.058868123 | 0.015417076 |
| 3.Heptanol | 1193.041667 | 1008.348074 | 0.023029974 | −0.205456135 | −0.111328282 |
| Heptanal | 1396.791667 | 920.0702903 | −0.113307135 | 0.141565621 | −0.025917554 |
| Methional | 79.625 | 148.3023823 | −0.110012922 | −0.130400953 | 0.093977633 |
| Pyrazine..2.5.dimethyl. | 3.333333333 | 7.857634774 | 0.020631611 | −0.116950274 | −0.004255769 |
| Pyrazine..2.6.dimethyl. | 178.2083333 | 574.8013672 | −0.145388496 | −0.007146465 | −0.001098366 |
| Pyrazine..ethyl. | 15.95833333 | 53.8796885 | −0.145442956 | −0.0000479 | −0.007415618 |
| Pyrazine..2.3.dimethyl. | 439.2083333 | 1498.775644 | −0.145413873 | 0.001518449 | −0.008807482 |
| Pyrazine..ethenyl. | 1.416666667 | 4.907477288 | −0.145349572 | 0.003673658 | −0.010721336 |
| Thiazole..4.5.dimethyl. | 3.583333333 | 12.41303079 | −0.145349572 | 0.003673658 | −0.010721336 |
| 2.Heptanone..6.methyl. | 53.75 | 186.1954618 | −0.145349572 | 0.003673658 | −0.010721336 |
| Hexanal..2.ethyl. | 78.41666667 | 124.6972381 | 0.018460956 | −0.027007294 | −0.179937424 |
| 2.Heptenal...Z.. | 645.25 | 937.3877266 | 0.021607084 | −0.093800543 | −0.190591625 |
| 5.Nonen.2.one | 13.33333333 | 46.18802154 | −0.145349572 | 0.003673658 | −0.010721336 |
| 2.Furancarboxaldehyde..5.methyl...cooked.milk. | 21.25 | 40.57288615 | 0.019206035 | −0.109620677 | 0.175448337 |
| Benzaldehyde | 872.875 | 1358.161493 | −0.142431906 | 0.046335544 | 0.024776943 |
| hexanoic.acid | 176.25 | 216.4210438 | −0.001128927 | 0.064879481 | −0.016090326 |
| 1.Octen.3.ol | 369.6666667 | 350.9919277 | −0.090672545 | −0.045064295 | −0.135474824 |
| Dimethyl.trisulfide | 14.33333333 | 21.56315601 | 0.028899179 | −0.064852089 | −0.150867075 |
| 2.5.Octanedione | 23.95833333 | 44.27674248 | 0.028988465 | −0.07590479 | −0.093752193 |
| 5.Hepten.2.one..6.methyl. | 1503.833333 | 4827.634134 | −0.145266246 | 0.005470194 | −0.014175912 |
| Furan..2.pentyl. | 633 | 967.4016276 | −0.078384616 | 0.167579691 | −0.035610073 |
| 2.4.Heptadienal...E.E.. | 20.83333333 | 43.16371231 | 0.024003523 | −0.071588186 | −0.145038829 |
| Pyrazine..2.ethyl.6.methyl. | 21 | 72.74613392 | −0.145349572 | 0.003673658 | −0.010721336 |
| Octanal | 1243.041667 | 897.5365644 | 0.063418428 | 0.197764097 | −0.01447548 |
| Pyrazine..trimethyl. | 348.6666667 | 1051.439497 | −0.144625394 | −0.018888681 | 0.009357594 |
| Pyrazine..2.ethyl.3.methyl. | 87.33333333 | 302.5315411 | −0.145349572 | 0.003673658 | −0.010721336 |
| 2.4.Heptadienal...E.E...1 | 26.33333333 | 40.42070427 | 0.033749609 | −0.100784032 | −0.199828071 |
| Pyrazine..2.ethenyl.6.methyl. | 5.541666667 | 19.19689645 | −0.145349572 | 0.003673658 | −0.010721336 |
| 1.Hexanol..2.ethyl. | 5684.541667 | 5078.453328 | 0.015454406 | −0.147033095 | −0.173896762 |

-continued

| Chemical | Center | Scale | PC1 | PC2 | PC3 |
|---|---|---|---|---|---|
| 3.Octen.2.one...E.. | 196.375 | 462.4334412 | 0.022433793 | −0.027668713 | −0.141800019 |
| X2H.Pyran.2.one..5.6.dihydro. | 683.3333333 | 845.025291 | 0.040235145 | 0.008083104 | −0.001975331 |
| Benzeneacetaldehyde | 31.83333333 | 60.74811383 | 0.01141478 | −0.200551415 | 0.147671091 |
| 3.5.Octadien.2.one...E.E.. | 455.125 | 426.6112306 | 0.024307307 | 0.191552198 | −0.040535191 |
| Acetophenone | 42.375 | 56.41088104 | 0.034819826 | 0.112028714 | 0.067831917 |
| 1.Decen.3.one | 3.125 | 9.100761706 | 0.014871492 | −0.007143686 | 0.067973089 |
| Pyrazine..3.ethyl.2.5.dimethyl. | 50.75 | 174.3908228 | −0.145387371 | 0.002524067 | −0.009700663 |
| Pyrazine..tetramethyl. | 951.4583333 | 3113.918129 | −0.145437121 | −0.00391206 | −0.005426362 |
| 5.Methyl.2.thiophenecarboxaldehyde | 57.375 | 198.7528302 | −0.145349572 | 0.003673658 | −0.010721336 |
| g.Heptalactone | 2 | 6.92820323 | 0.012980337 | 0.140814237 | 0.118375646 |
| Linalool | 9.833333333 | 34.06366588 | −0.145349572 | 0.003673658 | −0.010721336 |
| Nonanal | 1528.416667 | 1335.036088 | 0.053558189 | 0.198785653 | −0.109289305 |
| Thymol | 160.5833333 | 556.2769844 | −0.145349572 | 0.003673658 | −0.010721336 |
| Phenylethyl.Alcohol | 135.9583333 | 416.085189 | −0.145061726 | −0.01428243 | 0.003239013 |
| 2.3.5.Trimethyl.6.ethylpyrazine. | 208.7083333 | 718.7459552 | −0.145377878 | 0.002836895 | −0.00997845 |
| Acetic.acid..phenylmethyl.ester | 213.875 | 205.6043337 | 0.045438482 | 0.114758954 | 0.153953593 |
| Safranal | 47.29166667 | 163.8231389 | −0.145349572 | 0.003673658 | −0.010721336 |
| 2.Decenal...E.. | 55.04166667 | 78.60616976 | 0.034351801 | −0.012969523 | −0.21493625 |
| g.octalacone | 10.625 | 28.57933535 | 0.016392036 | 0.14295305 | 0.096452129 |
| o.Amino.acetophenone | 15.5 | 32.17070943 | 0.022315438 | 0.204041622 | 0.018370134 |
| 2.4.Decadienal | 9.416666667 | 24.16781606 | 0.0179089 | 0.169004115 | −0.038947428 |
| g.Nonlactone | 13.5 | 40.20345982 | 0.01493418 | 0.189230257 | 0.033376822 |
| Ionone | 101.3333333 | 351.0289637 | −0.145349572 | 0.003673658 | −0.010721336 |
| Geranyl.acetone | 652.75 | 2137.396627 | −0.145423518 | −0.002004031 | −0.008551463 |
| Ionene | 159.7916667 | 553.5345706 | −0.145349572 | 0.003673658 | −0.010721336 |
| g.Nonlactone.1 | 6.58755 | 22.81994259 | 0.016371012 | −0.075372449 | −0.049632645 |
| 2.4.Nonadienal...E.E.. | 18.07305674 | 30.64101284 | 0.031363408 | −0.023742328 | −0.174506137 |
| 2.4.Decadienal.1 | 50.4716275 | 85.11825112 | 0.029518821 | 0.094376773 | −0.171060695 |
| g.Heptalactone.1 | 17.25928968 | 42.07909242 | 0.017750131 | 0.158720982 | −0.019846703 |
| Ionone.1 | 199.0162875 | 689.4126429 | −0.145349572 | 0.003673658 | −0.010721336 |
| Geranyl.acetone.1 | 880.2922516 | 3049.421811 | −0.145349572 | 0.003673658 | −0.010721336 |
| a.Ionone | 335.0475951 | 1160.638915 | −0.145349572 | 0.003673658 | −0.010721336 |
| Peach.lactone.g.undecalactone | 72.77877498 | 34.06000193 | 0.097029409 | −0.071461906 | 0.084434422 |
| d.Decalactone | 85.57314465 | 106.5309321 | 0.034674859 | −0.18805394 | 0.077061807 |
| cis.Geranylacetone | 5.9584 | 20.64050306 | 0.011926134 | 0.016184168 | −0.063393798 |
| d.dodecalactone..δ.Nonyl.δ.valeralactone. | 1400.955104 | 491.4817796 | 0.130734715 | −0.059212775 | 0.033318423 |
| d.Undecalactone | 6472.792302 | 6394.323609 | 0.051826724 | −0.042456918 | −0.131176612 |

Plotting Factor: PC Standard Deviation * Square Root of number of samples from the model
PC1 23.79781
PC2 12.25408
PCS 11.48665

Further Discussion of Embodiments of the Invention

In the following paragraphs, certain embodiments of the present invention have been numbered for convenience sake. The numbers associated with each embodiment are arbitrary and are not intended to indicate the relative importance of the various embodiments.

1. A microalgal flour suitable for use in food, the flour comprising microalgal cells of *Chlorophyta*, wherein analysis by SPME according to Example 4 and SBSE according to Example 5 to determine concentrations of the compounds of Example 6 relative to an internal standard, followed by analysis according to the procedure of Example 9 produces a flavor descriptor that falls within the ellipsoid of Example 8 defining 3 standard deviations relative to the positive flavor cluster corresponding to the closed circles in the graph of FIG. 2.

2. A microalgal flour of embodiment 1, wherein the flavor descriptor falls within the ellipsoid of Example 8 defining 2 standard deviations relative to the positive flavor cluster corresponding to the closed circles in the graph of FIG. 2.

3. A microalgal flour of any of the preceding embodiments, wherein the flavor descriptor falls within the ellipsoid of Example 8 defining 1 standard deviation relative to the positive flavor cluster corresponding to the closed circles in the graph of FIG. 2.

4. A microalgal flour of any of the preceding embodiments, obtainable by the process of:
cultivating a broth of cells of *Chlorella protothecoides* in the dark in the presence of glucose as a fixed carbon source with a starting pH of 6.8, while maintaining the dissolved oxygen level above 30%, subjecting the broth to a high-temperature-short-time process of 75° C. for 1 minute, harvesting the cells by centrifugation with a dilution of 6.4 fold in water, adding an antioxidant, lysis of the cells by milling, and drying using a spray-dry nozzle outputting to a moving belt.

5. A microalgal flour of any of the preceding embodiments, comprising undecalactone (400-1800 ppb), 3-methyl butanal (0-11,000 ppb), pentanal (160-10,700 ppb), 2-methyl butanal (0-2500 ppb), 2-pentanone (39-10,600 ppb), and/or 3-pentene-2-one (0-1500 ppb) as determined by SPME or SBSE.

6. A microalgal flour of any of the preceding embodiments, having an undetectable fish or cabbage flavor when the flour is dispersed in deionized water at 10% (w/v), as detected by a tasting panel.

7. A microalgal flour of any of the preceding embodiments, having a flowability characterized by an oversize of 15-35% by weight at 2000 μm.

8. A microalgal flour according to any of the preceding embodiments wherein the flour is white, pale yellow or yellow in color.

9. A microalgal flour according to any of the preceding embodiments, comprising no apparent green color.

10. A microalgal flour according to any of the preceding embodiments, wherein the flour comprises 5-20% lipid.

11. A microalgal flour according to any of the preceding embodiments, wherein the flour comprises 30-70% lipid.

12. A microalgal flour according to any of the preceding embodiments, wherein the flour comprises 40-60% lipid.

13. A microalgal flour according to any of the preceding embodiments, wherein the pH of the flour when dissolved in water at 1% (w/v) is between 5.5 and 8.5.

14. A microalgal flour according to any of the preceding embodiments, wherein the pH of the flour when dissolved in water at 1% (w/v) is between 6.0 and 8.0.

15. A microalgal flour according to any of the preceding embodiments, wherein the pH of the flour when dissolved in water at 1% (w/v) is between 6.5 and 7.5.

16. A microalgal flour according to any of the preceding embodiments, having less than 2 ppm of chlorophyll.

17. A microalgal flour according to any of the preceding embodiments, further comprising an added antioxidant.

18. A microalgal flour according to any of the preceding embodiments, wherein the majority of the cells in the flour are lysed and optionally between 50 and 90% of the cells are lysed.

19. A microalgal flour obtainable by the process of:
cultivating a broth of cells of *Chlorella protothecoides* in the dark in the presence of glucose as a fixed carbon source with a starting pH of 6.8, while maintaining the dissolved oxygen level above 30%, subjecting the broth to a high-temperature-short-time process of 75° C. for 1 minute, harvesting the cells by centrifugation with a dilution of 6.4 fold in water, lysis of the cells by milling, adding an antioxidant, and drying using a spray-dry nozzle outputting to a moving belt.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. An edible microalgal flour suitable for use in food obtainable by the process of:
cultivating *Chlorella protothecoides* cells heterotrophically in the dark in the presence of fixed carbon source while substantially maintaining the dissolved oxygen level above 30% until the microalgae reach a desired density and lipid concentration,
subjecting the cells to a high-temperature-short-time pasteurization process;
washing and harvesting the cells;
lysing between 50% and 90% of the cells; and
drying the lysed cells in a spray dryer;
wherein the microalgal flour comprises a lipid content between 35% and 75% and less than 200 ppm of chlorophyll; and
the microalgal flour comprises one or more compounds that define a flavor descriptor of the microalgal flour, said one or more compounds selected from the group consisting of: dimethyl sulfide, 2,3-butanedione, butanal, 2-methylpropanal, 3-methyl furan, ethyl acetate, (2E)-but-2-enal, 3-methyl-butanal, 1-butanol, 2-methyl butanal, thiophene, 1-pentene-3-ol, 1-penten-3-one, 2-pentanone, 2,3-pentanedione, pentanal, 2-ethyl furan, thiozole, 3-penten-2-one, dimethyl disulfide, E-2-pentenal, pyrrole, 4,5-dimethyl oxazole, cis-2-Penten-1-ol, 3-methyl thiophene, hexanal, 4-methyltyhiazole, methyl pyrazine, furfural, trimethyl oxaxole, 3-methyl butanoic acid, 2-methyl butanoic acid, 2-hexenal, 1-hexanol, 4-heptanone, 2,6-dimethyl pyridine, 2,4-dimethyl thiazole, 3-heptanone, 2-heptanone, 3-heptanol, heptanal, methional, 2,5-dimethyl pyrazine, 2,6-dimethyl pyrazine, ethyl pyrazine, 2,3-dimethyl pyrazine, ethenyl pyrazine, 4,5-dimethyl thiazole, 6-methyl-2-heptanone, 2-ethyl hexanal, (Z)-2-Heptenal, non-3-en-2-one, 5-methyl furfural, benzaldehyde, hexanoic acid, 1-octen-3-ol, dimethyl.trisulfide, 2,5-octanedione, 6-methyl-5-hepten-2-one, 2-pentyl furan, (2E,4E)-hepta-2,4-dienal, 2-ethyl-6-methylpyrazine, octanal, trimethyl pyrazine, 2-ethyl-3-methyl pyrazine, 2-ethylhexanol, E-3-octen-2-one, 5,6-dihydro-2H-pyran-2-one, benzeneacetaldehyde, 3,5-Octadiene-2-one, acetophenone, 1-octen-3-one, 2,5-dimethyl-3-ethylpyrazine, tetramethyl pyrazine, 5-methyl-2-thiophenecarboxaldehyde, g-heptalactone, linalool, nonanal, thymol, phenethyl alcohol, 2,3,5-trimethyl-6-ethyl pyrazine, benzyl acetate, safranal, E-2-decenal, g-octalacone, o-amino.acetophenone, 2,4-decadienal, g-nonalactone, ionone, geranyl acetate, ionene, 2,4-nonadienal, 2,4-decadienal, g-undecalactone, d-decalactone, cis-geranylacetone, δ-Dodecalactone, and d-undecalactone; and the flavor descriptor falls within a three-dimensional ellipsoid in a flavor-description space having dimensions defined by three principle components, PC1, PC2, and PC3, the ellipsoid defined by the equation:

$$A_x^2 + B_{xy} + C_y^2 + D_x + E_y + F = 0,$$

wherein A, B, C, D, E, and F are defined below and represent three standard deviations from the center point of the ellipsoid:

| X | Y | A | B | C |
|---|---|---|---|---|
| PC1 | PC2 | 0.003481467 | −0.000366174 | 3.79437E−05 |
| PC1 | PC3 | 0.001734328 | 0.000286969 | 1.89401E−05 |
| PC2 | PC3 | 0.356218856 | 0.289219807 | 0.356936631 |

| X | Y | D | E | F |
|---|---|---|---|---|
| PC1 | PC2 | −0.000628924 | 4.27301E−05 | 1.51548E−05 |
| PC1 | PC3 | −0.000318201 | −2.8099E−05 | 1.12003E−05 |
| PC2 | PC3 | 0.085191149 | −0.040237159 | −0.13812915 | wherein the flavor descriptor represents a property of the microalgal flour.

2. The edible microalgal flour of claim 1, wherein A, B, C, D, E, and F are defined below and represent two standard deviations from the center point of the ellipsoid:

| X | Y | A | B | C | D | E | F |
|---|---|---|---|---|---|---|---|
| PC1 | PC2 | 0.000477458 | −5.02181E−05 | 5.2037E−06 | −8.62524E−05 | 5.86012E−06 | 3.01302E−06 |
| PC1 | PC3 | 0.00023785 | 3.93556E−05 | 2.5975E−06 | −4.3639E−05 | −3.85357E−06 | 1.76892E−06 |
| PC2 | PC3 | 0.048852827 | 0.039664394 | 0.048951264 | 0.011683347 | −0.005518234 | −0.009118978. |

3. The edible microalgal flour of claim 1, wherein A, B, C, D, E, and F are defined below and represent one standard deviation from the center point of the ellipsoid:

| X | Y | A | B | C | D | E | F |
|---|---|---|---|---|---|---|---|
| PC1 | PC2 | 2.78319E−05 | −2.9273E−06 | 3.03333E−07 | −5.0278E−06 | 3.41597E−07 | 2.11154E−07 |
| PC1 | PC3 | 1.38647E−05 | 2.29411E−06 | 1.51413E−07 | −2.54379E−06 | −2.24631E−07 | 1.11963E−07 |
| PC2 | PC3 | −0.000665829 | 0.000466136 | −0.000152694 | 0.000380618 | −0.000136456 | −4.14371E−05. |

4. The edible microalgal flour of claim 1, wherein the fixed carbon source is glucose.

5. The edible microalalgal flour of claim 1, wherein cultivating the *Chlorella protothecoides* cells heterotrophically in the dark further comprises limiting the availability of nitrogen.

6. The edible microalgal flour of claim 1, wherein the cells are cultivated at a pH of 4 to 9.

7. The edible microalgal flour of claim 1, wherein high-temperature-short-time pasteurization process comprises heating the broth to a temperature of from 70° C. to 95° C. for 10 to 180 seconds.

8. The edible microalgal flour of claim 1, wherein high-temperature-short-time pasteurization process further comprises immediately cooling the cells after heating.

9. The edible microalgal flour of claim 1, wherein the washing and harvesting of the cells is carried out by centrifugation, filtration, or dialysis.

10. The edible microalgal flour of claim 1, wherein the process further comprises adding a preservative to the cells of *Chlorella protothecoides* after subjecting them to the high-temperature-short-time pasteurization process.

11. The edible microalgal flour of claim 10, wherein the preservative is sodium benzoate and/or potassium sorbate.

12. The edible microalgal flour of claim 1, wherein the *Chlorella protothecoides* cells are lysed with a bead mill.

13. The edible microalgal flour of claim 1, wherein the process further comprising homogenizing the *Chlorella protothecoides* cells before drying them.

14. The edible microalgal flour of claim 1, wherein the process further comprises holding the lysed cells of *Chlorella protothecoides* at a temperature of 70° C. to 80° C. for 1 to 6 minutes before drying them.

15. The edible microalgal flour of claim 1, wherein the lysed *Chlorella protothecoides* cells are dried using a spray dryer.

16. The spray dryer of claim 15, wherein the spray dryer is a box dryer.

17. The spray dryer of claim 15, wherein the spray dryer is a tall form dryer.

18. The spray dryer of claim 15, wherein the spray dryer is a fluidized bed dryer.

19. The edible microalgal flour of claim 1 having a lipid content between 40% to 60%.

20. The edible microalgal flour of claim 1 having a pH between 5.5 and 8.5 when dissolved in water at 1% (w/v).

21. The edible microalgal flour of claim 1 having a pH between 6.0 and 8.0 when dissolved in water at 1% (w/v).

22. The edible microalgal flour of claim 1 having a pH between 6.5 and 7.5 when dissolved in water at 1% (w/v).

23. The edible microalgal flour of claim 1 comprising less than 100 ppm of chlorophyll.

\* \* \* \* \*